United States Patent
Chhabra et al.

(10) Patent No.: US 10,142,167 B2
(45) Date of Patent: Nov. 27, 2018

(54) PEER-ASSISTED IMAGE UPDATE WITH SELF-HEALING CAPABILITIES

(71) Applicant: Cisco Technology, Inc., San Jose, CA (US)

(72) Inventors: Gaurav Chhabra, Karnataka (IN);
Ather Sayeed Kanak, Karnataka (IN);
Shashi Kumar Bansal, Karnataka (IN);
Michael H. Behringer, La Colle sur Loup (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 71 days.

(21) Appl. No.: 14/711,035

(22) Filed: May 13, 2015

(65) Prior Publication Data

US 2016/0337169 A1    Nov. 17, 2016

(51) Int. Cl.
*H04L 12/24*    (2006.01)
*H04L 12/707*    (2013.01)

(52) U.S. Cl.
CPC ........ *H04L 41/0672* (2013.01); *H04L 41/082* (2013.01); *H04L 45/22* (2013.01)

(58) Field of Classification Search
None
See application file for complete search history.

(56) References Cited

U.S. PATENT DOCUMENTS

| 8,214,470 B2 * | 7/2012 | Quilty | G06F 8/65 |
| | | | 709/208 |
| 9,367,515 B1 * | 6/2016 | Myers | G06F 15/177 |
| 2004/0015940 A1 | 1/2004 | Heisey et al. | |
| 2008/0130639 A1 | 6/2008 | Costa-Requena et al. | |
| 2008/0320110 A1 * | 12/2008 | Pathak | G06F 11/1433 |
| | | | 709/220 |
| 2010/0257403 A1 * | 10/2010 | Virk | G06F 11/1453 |
| | | | 714/15 |
| 2010/0309785 A1 * | 12/2010 | Sassi | H04L 12/4633 |
| | | | 370/232 |
| 2013/0060815 A1 * | 3/2013 | Saeki | G06F 17/30575 |
| | | | 707/802 |
| 2013/0117565 A1 | 5/2013 | He | |
| 2014/0189677 A1 * | 7/2014 | Curzi | G06F 8/65 |
| | | | 717/171 |
| 2014/0195671 A1 * | 7/2014 | Joyal | H04L 45/025 |
| | | | 709/224 |
| 2014/0207844 A1 * | 7/2014 | Mayo | H04L 67/34 |
| | | | 709/203 |
| 2014/0298091 A1 * | 10/2014 | Carlen | H04L 65/80 |
| | | | 714/15 |

(Continued)

OTHER PUBLICATIONS

Configuration Management with Cisco Prime LAN Management Solution 4.2; OL-25941-01; Cisco Systems, Inc.; pp. 1-108.

*Primary Examiner* — George C Atkins
(74) *Attorney, Agent, or Firm* — Parker Ibrahim & Berg LLP; James M. Behmke; Stephen D. LeBarron

(57) ABSTRACT

In one embodiment, a device in a network receives update recovery data from a neighbor of the device in the network. The device monitors the neighbor during installation of a software update by the neighbor. The device detects an installation failure of the software update by the neighbor. The device causes recovery of the neighbor using the update recovery data, in response to detecting the installation failure of the software update by the neighbor.

20 Claims, 23 Drawing Sheets

(56) References Cited

U.S. PATENT DOCUMENTS

| | | | |
|---|---|---|---|
| 2015/0178064 A1* | 6/2015 | Cairns | G06F 8/65 717/171 |
| 2016/0259637 A1* | 9/2016 | Kumar | G06F 8/65 |
| 2016/0315803 A1* | 10/2016 | Sadana | H04L 41/082 |

* cited by examiner

PEER-ASSISTED IMAGE UPDATE WITH SELF-HEALING CAPABILITIES

TECHNICAL FIELD

The present disclosure relates generally to computer networks, and, more particularly, to systems and methods that allow for peer-assisted image updates with self-healing capabilities to be performed in a network.

BACKGROUND

Enterprise networks often include a large number of networking devices such as routers, switches, servers, and the like. During the lifespan of a networking device, the manufacturer of the device may issue any number of software updates/upgrades, to fix bugs, address security concerns, and/or provide new features to the device. However, despite the various benefits of installing updates to the devices in a network, many network administrators choose to delay installing an update or opt against performing an update entirely. For example, some administrators may only upgrade the devices in a network every two years, to install the cumulative updates that were released since the last time the devices were updated.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
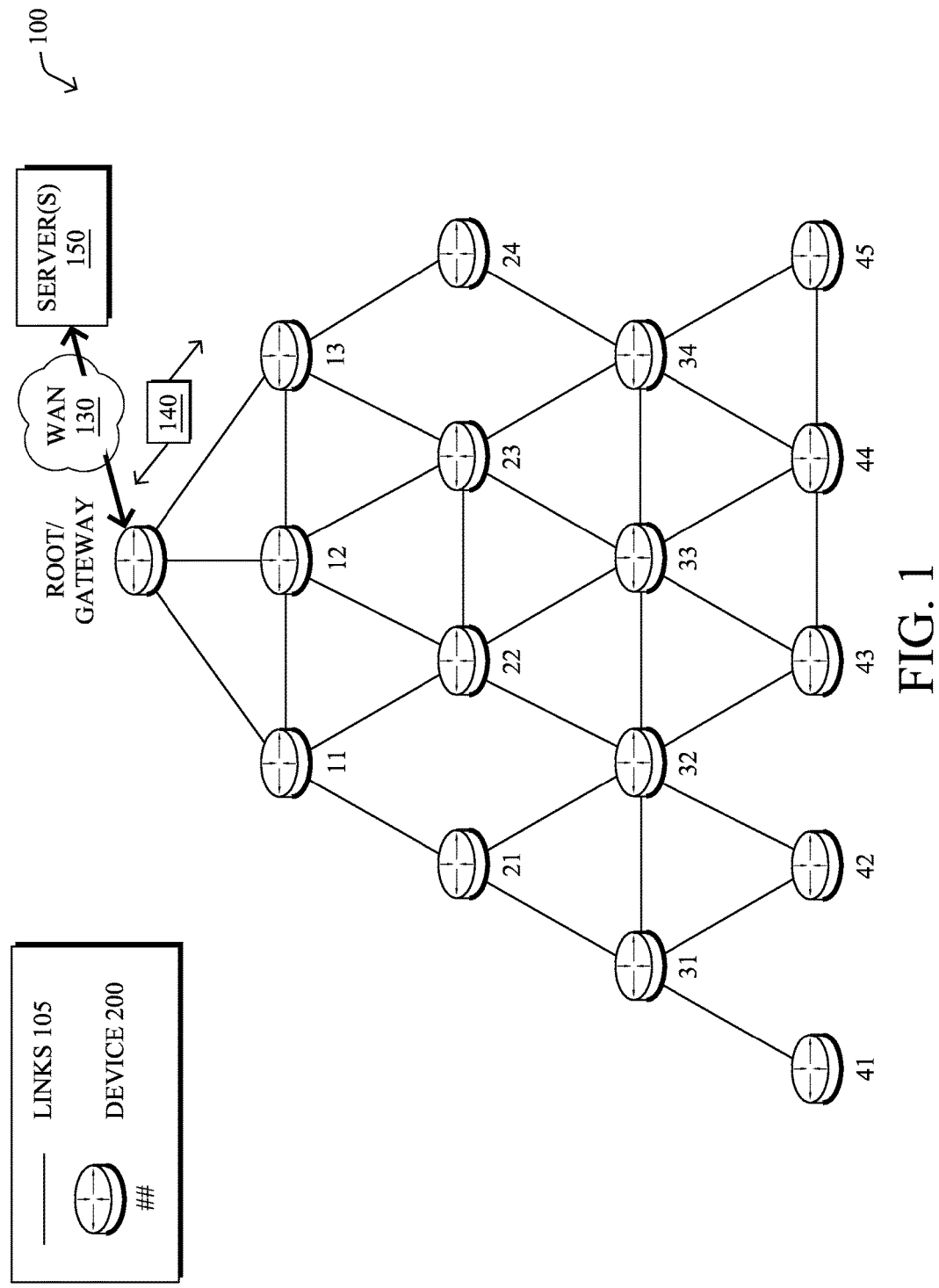
FIG. 1 illustrates an example communication network.

According to one or more embodiments of the disclosure, a device in a network receives update recovery data from a neighbor of the device in the network. The device monitors the neighbor during installation of a software update by the neighbor. The device detects an installation failure of the software update by the neighbor. The device causes recovery of the neighbor using the update recovery data, in response to detecting the installation failure of the software update by the neighbor.

In further embodiments, a device in a network provides update recovery data to a neighbor of the device in the network. The device causes network traffic to be routed away from the device. The device attempts installation of a software update. The device receives the update recovery data from the neighbor, in response to an installation failure of the software update by the device.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, a "root/gateway," "11," "12," ... "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative Root/Gateway node, such as a border router, a field area router (FAR) of a FAN, or the like, may interconnect the local network with a WAN 130, which may house one or more other relevant devices such as management devices or servers 150, e.g., a network management server (NMS), a dynamic host configuration protocol (DHCP) server, a constrained application protocol (CoAP) server, an upgrade image repository, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "Root/Gateway" node, the network 100 is merely an example illustration that is not meant to limit the disclosure.

Data packets 140 (e.g., traffic and/or messages) may be exchanged among the nodes/devices 200 of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
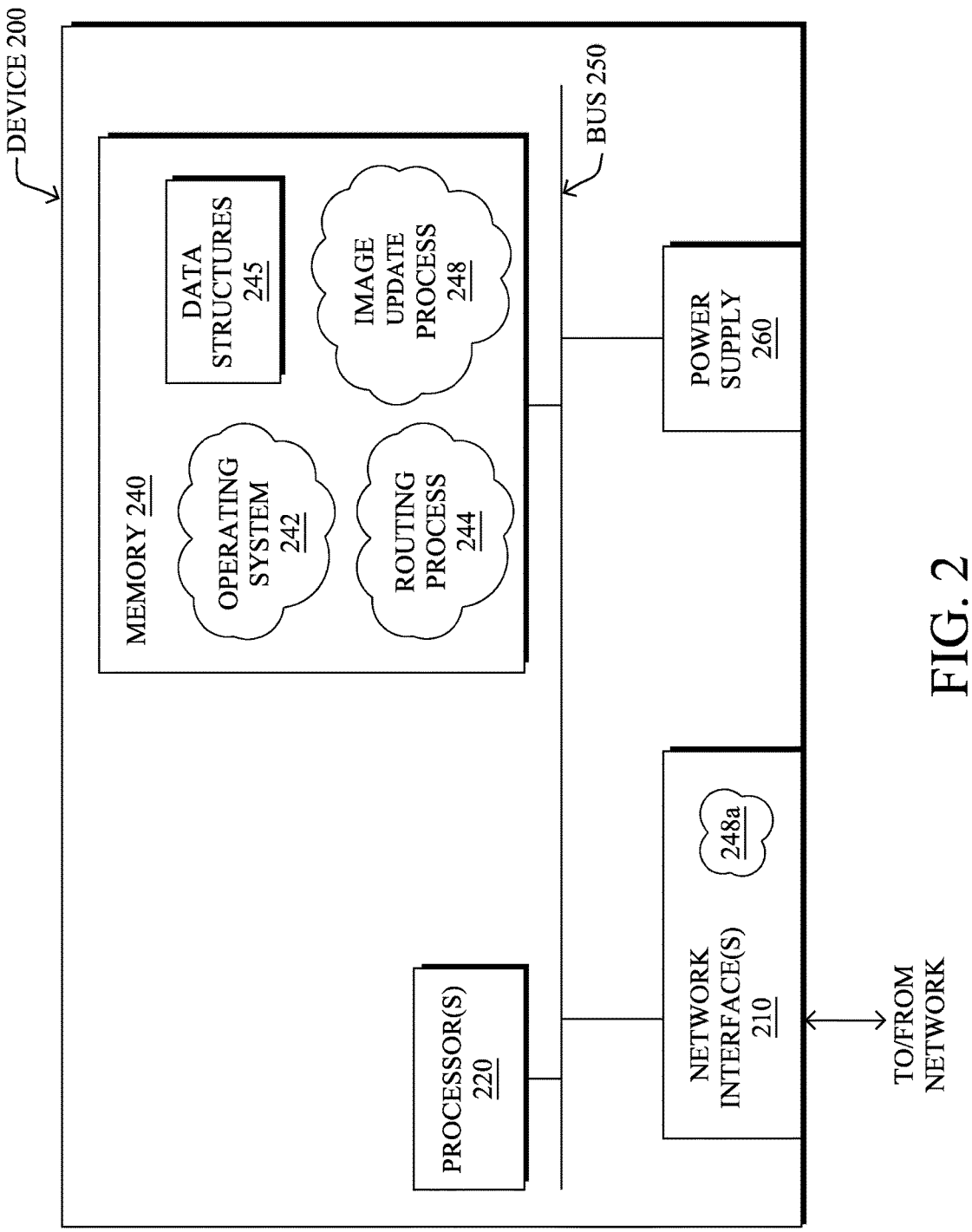
FIG. 2 illustrates an example networking device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 includes a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative image (e.g., software) update process 248, which may be configured depending upon the particular node/device within the network 100. Note also that while image update process 248 is shown in centralized memory 240, alternative embodiments provide for at least a portion of process 248 to be specifically operated within the network interfaces 210 (e.g., "248*a*").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

As will be appreciated, the above topologies are illustrative only and the techniques herein may also be used in non-traditional forms computer network. For example, the techniques herein may be adapted for use in a mesh network, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the public Internet or a private network.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside an IoT network, such as a low power and lossy network (LLN), towards a central control point (e.g., LLN Border Routers (LBRs) or "Root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Image update process 248, as described in greater detail below, is configured to facilitate the installation of a software/image update on device 200 itself (e.g., to operating system 242, routing process 244, etc.) and/or on another device in the network. Typically, a software update is also an upgrade that provides additional features and/or functionality. However, as would be appreciated, a software update may sometimes revert a device to a prior version of an image or application, such as when a bug in the latest version in detected and a downgrade is performed.

As noted above, image/software updates of networking devices can be time consuming and difficult. For example, it is estimated that 40-50% of all software updates to networking devices (e.g., routers, etc.) fail. This high failure rate has led to many network administrators postponing the installation of updates or ignoring the updates completely. For example, many network administrators may opt to install operating system updates every other year or even longer.

Peer-Assisted Image Update with Self-Healing Capabilities

According to the techniques herein, software updates may be installed automatically by networking devices in a distributed manner, making the techniques herein suitable for both traditional networks as well for as distributed networks (e.g., IoT networks). In some aspects, a peer/neighbor of a device to be updated may be selected to facilitate error handling during the update and the automatic recovery of the device, should an installation failure occur. In some cases, the peer/neighbor may maintain the running state of the device before the update and compare the stored state of the device to the post-installation state of the device, to detect an installation failure. In such a case, the peer/neighbor may initiate corrective measures such as rolling back the installation of the software update on the device, notifying a network administrator via a user interface (e.g., a keyboard, touch screen display, etc.), or the like. As would be appreciated, having an adjacent peer provide monitoring and correction of a failed installation may enable the automatic resolution of the failure, particularly in cases where the installing device is no longer reachable by an NMS or other supervisory device. As used herein, an installation failure generally refers to any software or hardware failure that may occur at a device during the update installation process (e.g., an inability to fully install the update, a loss of functionality during or after installation of the update, etc.).

Illustratively, the techniques described herein may be performed by hardware, software, and/or firmware, such as in accordance with the image update process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as various routing protocols (e.g., ISIS, OSPF, etc.), and as such, may be processed by similar components understood in the art that execute those protocols, accordingly.

Specifically, according to various embodiments, a device in a network receives update recovery data from a neighbor of the device in the network. The device monitors the neighbor during installation of a software update by the neighbor. The device detects an installation failure of the software update by the neighbor. The device causes recovery of the neighbor using the update recovery data, in response to detecting the installation failure of the software update by the neighbor.

Operationally, a transport gateway (e.g., a Root/Gateway node) may determine that a new image/software update is available (e.g., by polling a remote image repository, by receiving a notification, etc.). In turn, the gateway device may check the image type and broadcast data regarding the update to the devices in the local network, allowing each device to determine whether it needs the update and, if so, notify the gateway to download the image. Once the image/software update has been downloaded and validated by a particular device, the device may determine its own readiness to install the update (e.g., by running any number of pre-installation checks, by notifying a user interface device associated with an administrator, etc.). If a device is ready to install the update, it may select a peer/neighbor to monitor the device during installation of the update. Such a monitor may receive data regarding the pre-installation state of the device and use this information to recover the device, in the case of an installation failure. The monitor may also provide alerts to the network administrator during the installation. After installation, the device may perform any number of post-installation checks, to ensure that the installation was successful.

Figure 3A:
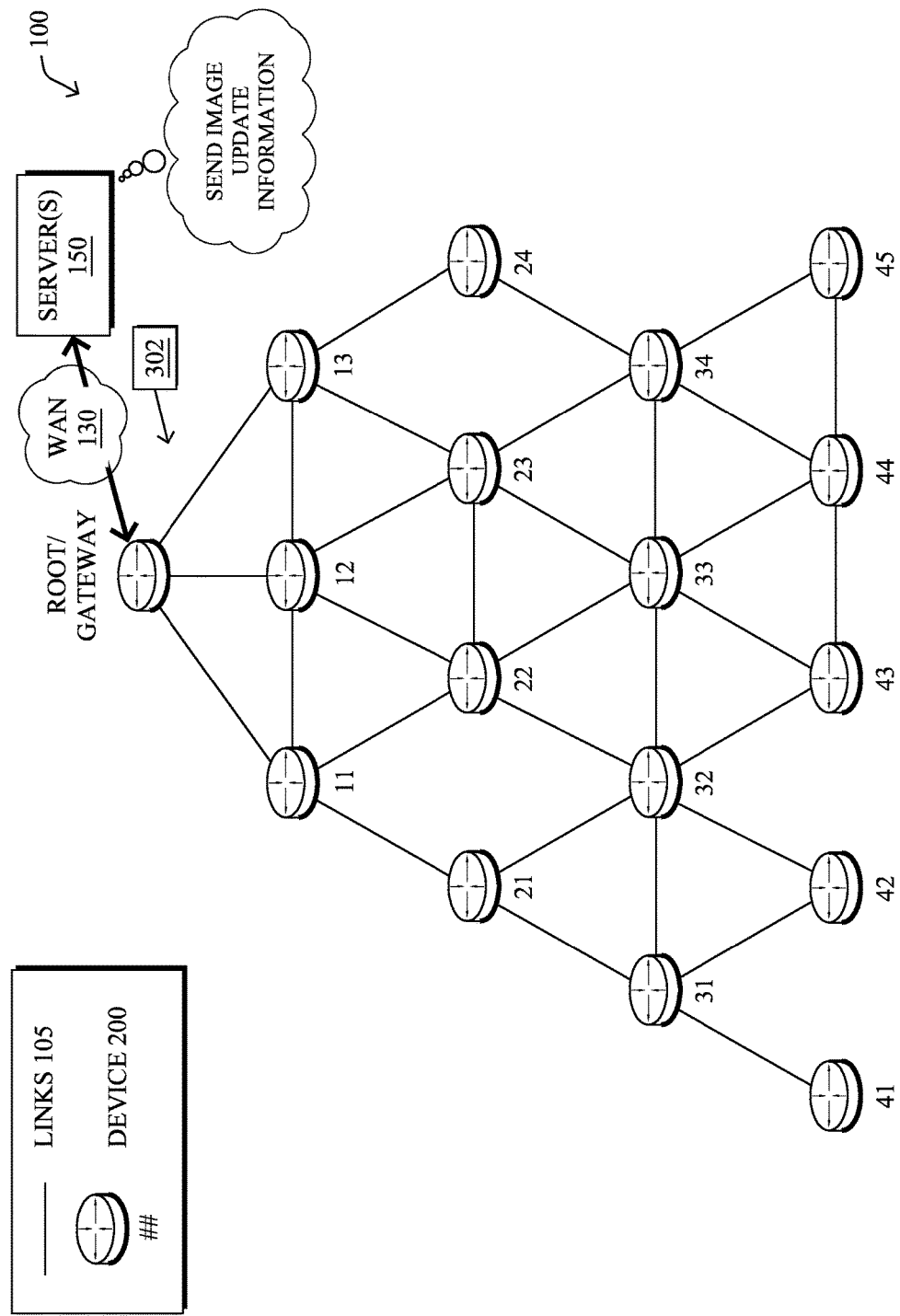
FIGS. 3A-3C illustrate an example of the upgrade eligibility of a device being identified in a network.
Figure 3B:
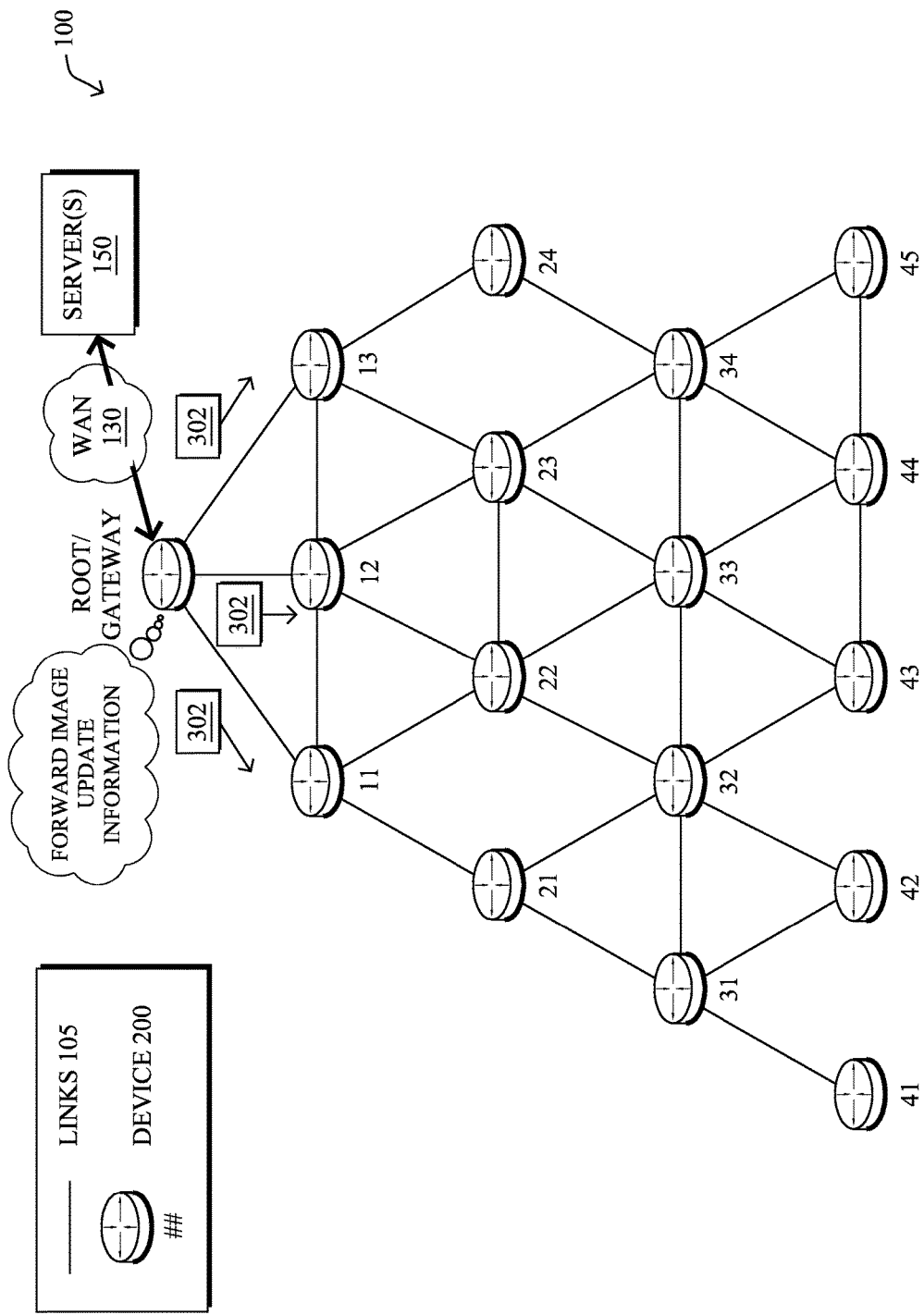
Figure 3C:
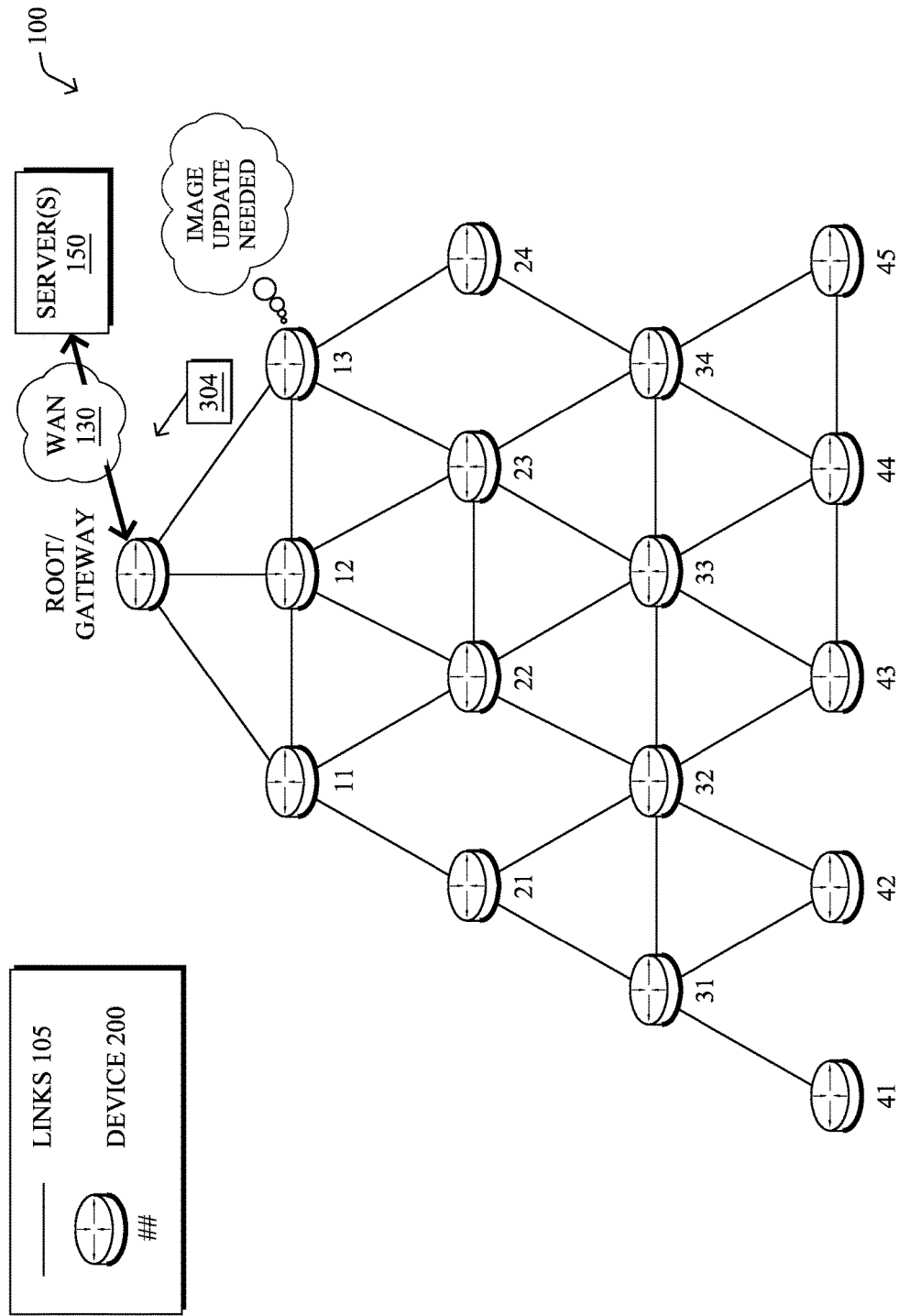

Referring now to FIGS. 3A-3C, an example is shown of the upgrade eligibility of a device being identified in a network, according to various embodiments. As shown, the nodes/devices 200 in network 100 may remain in an idle state with respect to software updates until a new image/software update is available (e.g., via one of servers 150). While in the idle state, the devices may await an indication that a new image/software update is available. For example, as shown, one of servers 150 (e.g., an NMS, etc.) may send software/image update information 302 to the Root/Gateway node. In general, update information 302 may indicate any or all of the following:

- An image identifier—e.g., the name, version, or other information that identifies the particular software update.
- An urgency value—e.g., whether the update is a critical update, etc.
- An update size—e.g., the size of the software/image update file(s)
- A maintenance/installation window—e.g., a set period of time during which the target devices are to install the update. Such a window may be set by an administrator, be computed based on period of low network usage, etc. In some cases, the window may be periodic (e.g., every Sunday from 12:00 AM to 4:00 PM).
- A set of eligible device(s)/device types—e.g., which devices should install the update, if a device has not done so already.
- A set of excluded devices/device types—e.g., which device should explicitly ignore the available update.

In one embodiment, image update information 302 may be provided to devices 200 on a push basis. For example, one of servers 150 may send image update information 302 to the Root/Gateway device in response to a new image being uploaded, in response to a request from a user interface device (e.g., a network administrator requests that information 302 be sent, to initiate the installation of a software update), or at any other time (e.g., periodically, at specific times, etc.). In another embodiment, the Root/ Gateway and/or any of the other devices in network 100 may poll server 150 for image update information 302. For example, node 13 may query server 150 for the availability of new images or the Root/Gateway node may do so on behalf of node 13.

As shown in FIG. 3B, the Root/Gateway node may distribute image update information 302 to one or more of the nodes 11-45 in network 100. In some embodiments, the Root/Gateway may broadcast or multicast (e.g., to a selected set of nodes) image update information 302 to multiple nodes in network 100. In another embodiment, the Root/ Gateway may send image update information 302 as a unicast message to a specific one of the nodes. For example, a network administrator may specify a specific one of nodes 11-45 to test for eligibility to install the image update.

In some embodiments, a given device 200 in network 100 may use image update information 302 to determine whether the image/software update is applicable to the device. For example, as shown in FIG. 3C, node 13 may determine that the available image update associated with image update information 302 should be installed by node 13. In response, node 13 may send a notification 304 to the Root/Gateway and/or to server 150, indicating that node 13 is eligible to install the update. For example, if the Root/Gateway broadcasts image update information 302 to nodes 11-45, each node may individually determine whether or not the update should be installed locally.

In further embodiments, the decision as to device eligibility for an image update may be controlled by a central device (e.g., the Root/Gateway, server 150, etc.) based on stored information regarding each of nodes 11-45. For example, server 150 may store data regarding the device types, makes, models, installed software (e.g., operating systems, services, etc.), or the like, and use this information to determine which devices are eligible to install the image update. In another embodiment, installation eligibility may be based in part on input from a user interface device (e.g., as specified by a network administrator). For example, an administrator may specify which devices should be included or excluded from the installation, a maintenance window during which installations should take place, the target device type(s), etc.

Figure 4A:
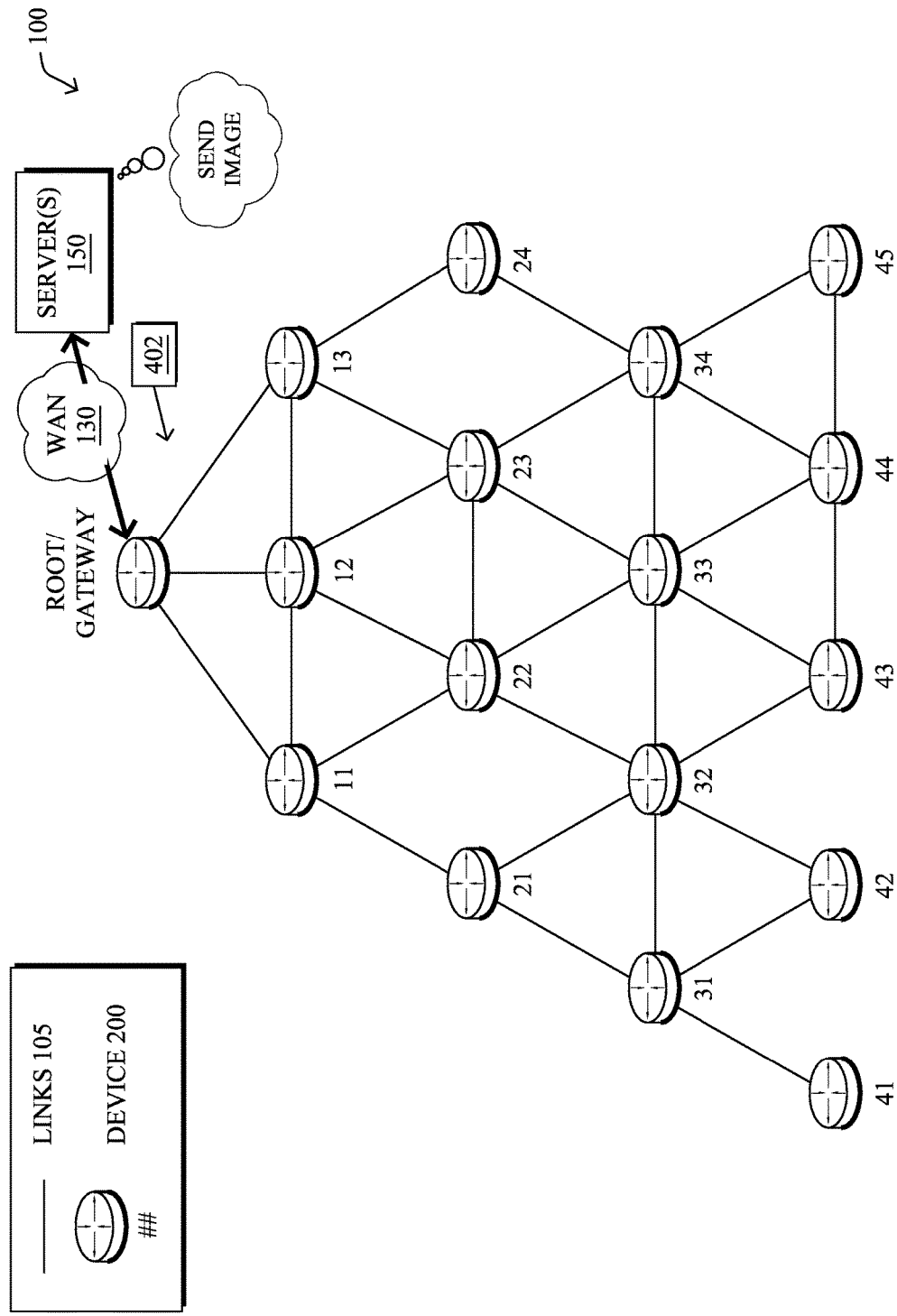
FIGS. 4A-4F illustrate examples of update installations being distributed and scheduled.
Figure 4B:
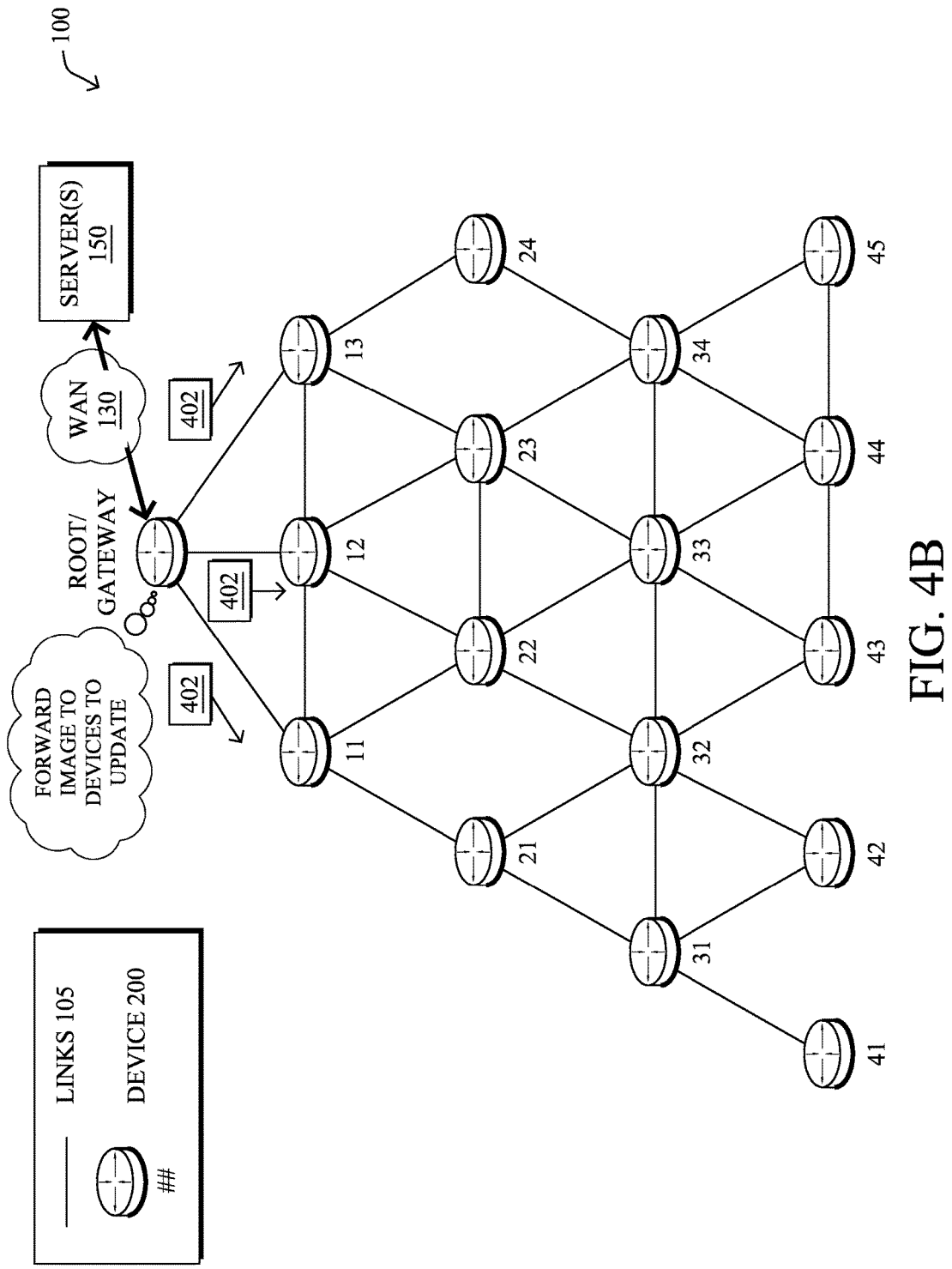

Once the set of one or more devices eligible for installation of the update are identified, the image update may be provided to the one or more devices and the installation(s) may be scheduled. FIGS. 4A-4F illustrate examples of update installations being distributed and scheduled. As shown in FIGS. 4A-4B, the image repository (e.g., one of servers 150) may provide software/image update 402 to the Root/Gateway, which then forwards image update 402 to the one or more nodes/devices identified as eligible to install update 402. For example, the Root/Gateway may provide update 402 to a particular device in the network that indicated that it is eligible to install update 402 (e.g., node 13 may enroll to receive update 402 by sending notification 304 to the Root/Gateway, as shown in FIG. 3C). In another embodiment, the nodes/devices in network 100 may use peer-to-peer sharing, to disseminate update 402 to the devices eligible for the update. For example, a particular node/device may query its peers/neighbors, to determine whether any of its peers has update 402 and, if so, obtain update 402 from the peer, before turning to the Root/ Gateway or server 150 for update 402. In yet another embodiment, a given device may download software/image update 402 on a pull basis, such as by issuing a File Transfer Protocol (FTP) request to server 150 or to the Root/Gateway.

In some cases, a device eligible to install software/image update 402 may not have enough free space to store update 402. In one embodiment, an eligible device may first test whether or not it has sufficient disk space to store update 402 (e.g., by comparing the size of update 402, as indicated in image update information 302, to its available disk space), before attempting to download update 402. If enough space is not available, the device may provide a notification to a network administrator, so that files on the device can be cleared. In another embodiment, the device may attempt to clear space on its own accord based on any number of predefined rules (e.g., to remove log files older than a certain amount, to empty a temporary folder, etc.).

Figure 4C:
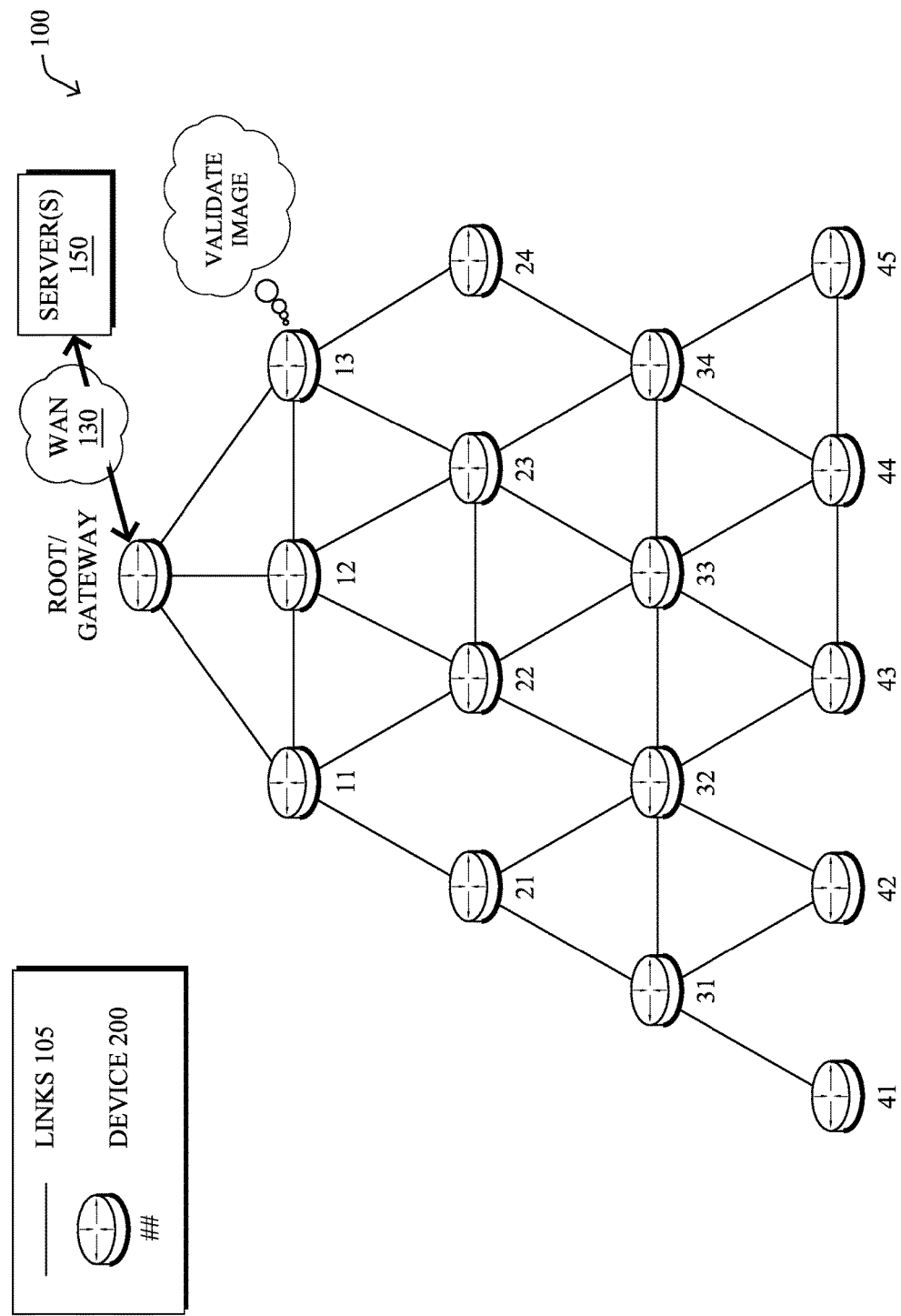

Software/image update 402 may also be signed, thereby allowing a device eligible to install update 402 to validate update 402, prior to installation. For example, as shown in FIG. 4C, assume that server 150 generates and maintains a hash/md5 associated with update 402, generates a file (e.g., named <image_name>_hash.txt, etc.), and include this file as part of update 402. In turn, as shown, the receiving device, such as node 13, may validate whether the signature is valid, to prevent unauthorized attempts to change the software of node 13. If node 13 cannot validate update 402, it may halt any installation of update 402 and provide a notification to one of servers 150, to alert the network administrator.

Figure 4D:
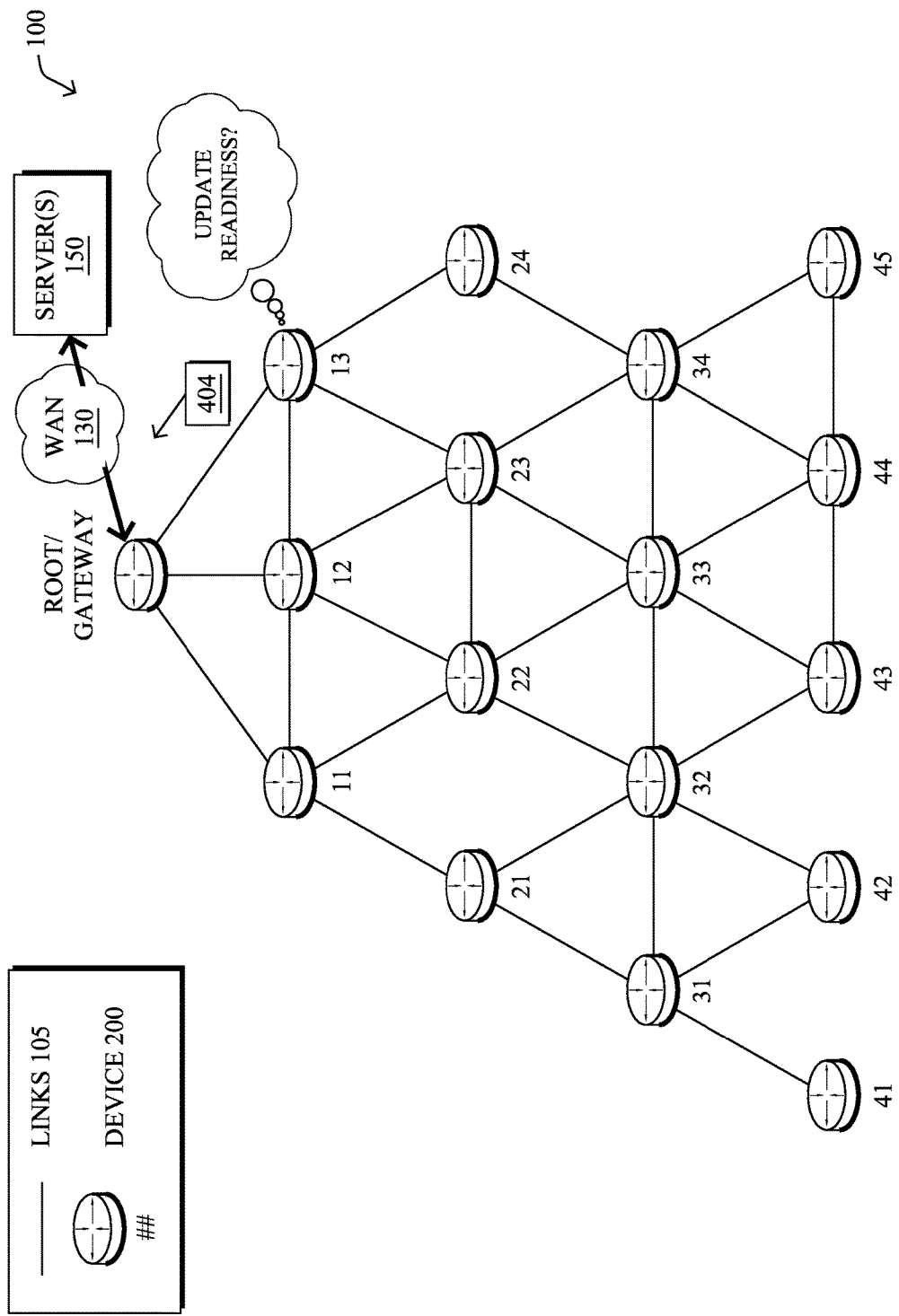

Prior to attempting to install a software/image update, a device may perform an update readiness check. For example, as illustrated in FIG. 4D, node 13 may perform an update readiness check, at one or more points in time prior to attempting to install software/image update 402 (e.g., as part of its eligibility determination, in response to receiving update 402, etc.). In general, an update readiness check may entail the device determining whether it has sufficient resources to support installation of the update. For example, node 13 may analyze its current and/or historical resource usage (e.g., CPU, memory, etc.), to determine whether its available resources are sufficient to install update 402. Node 13 may then provide a notification 404 to the device overseeing the installation process (e.g., the Root/Gateway, server 150, etc.) that indicates whether node 13 is ready to begin installing update 402. For example, notification 404 may alert a network administrator as to the problem at node 13, allowing the administrator to take corrective measures.

Figure 4E:
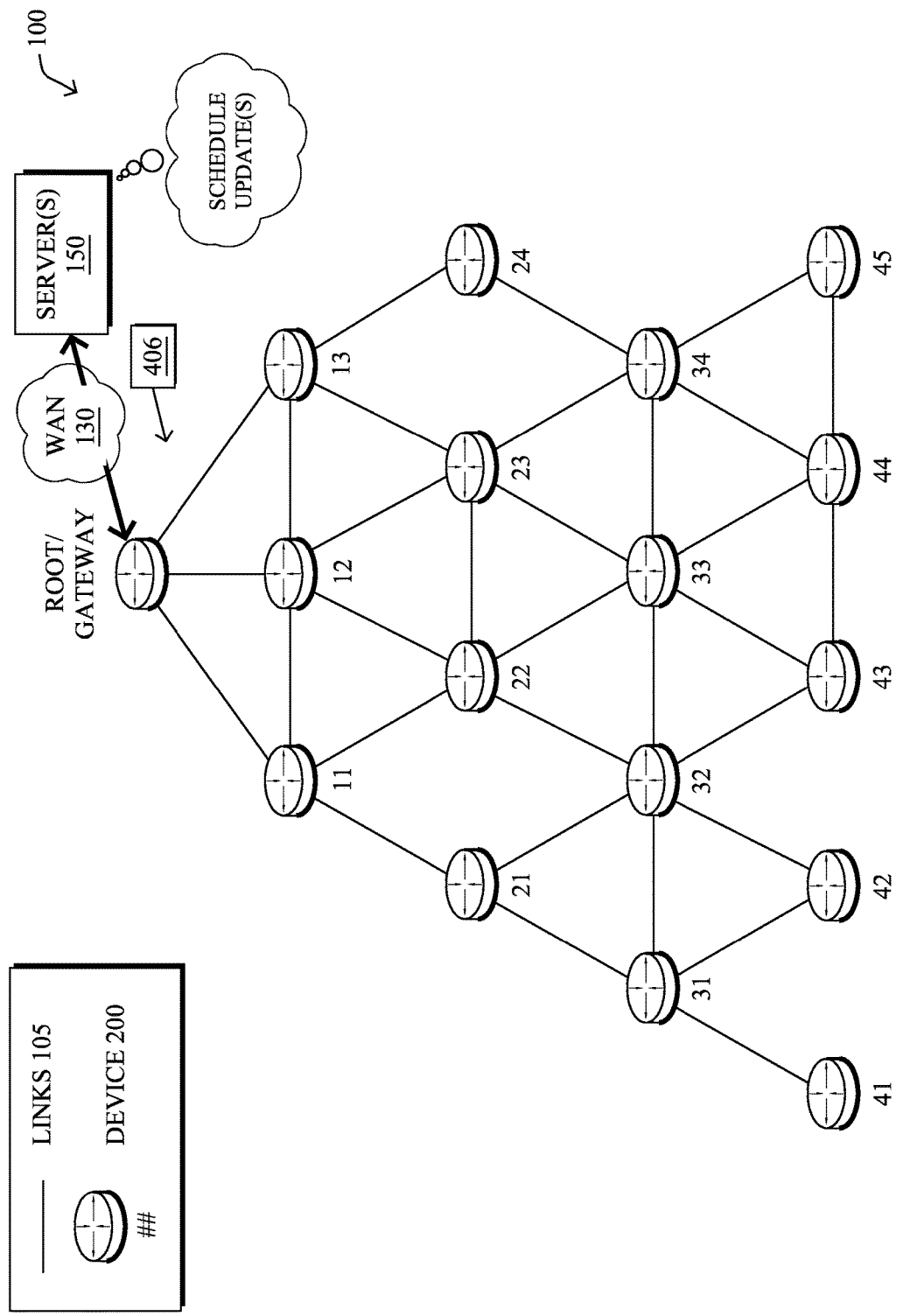
Figure 4F:
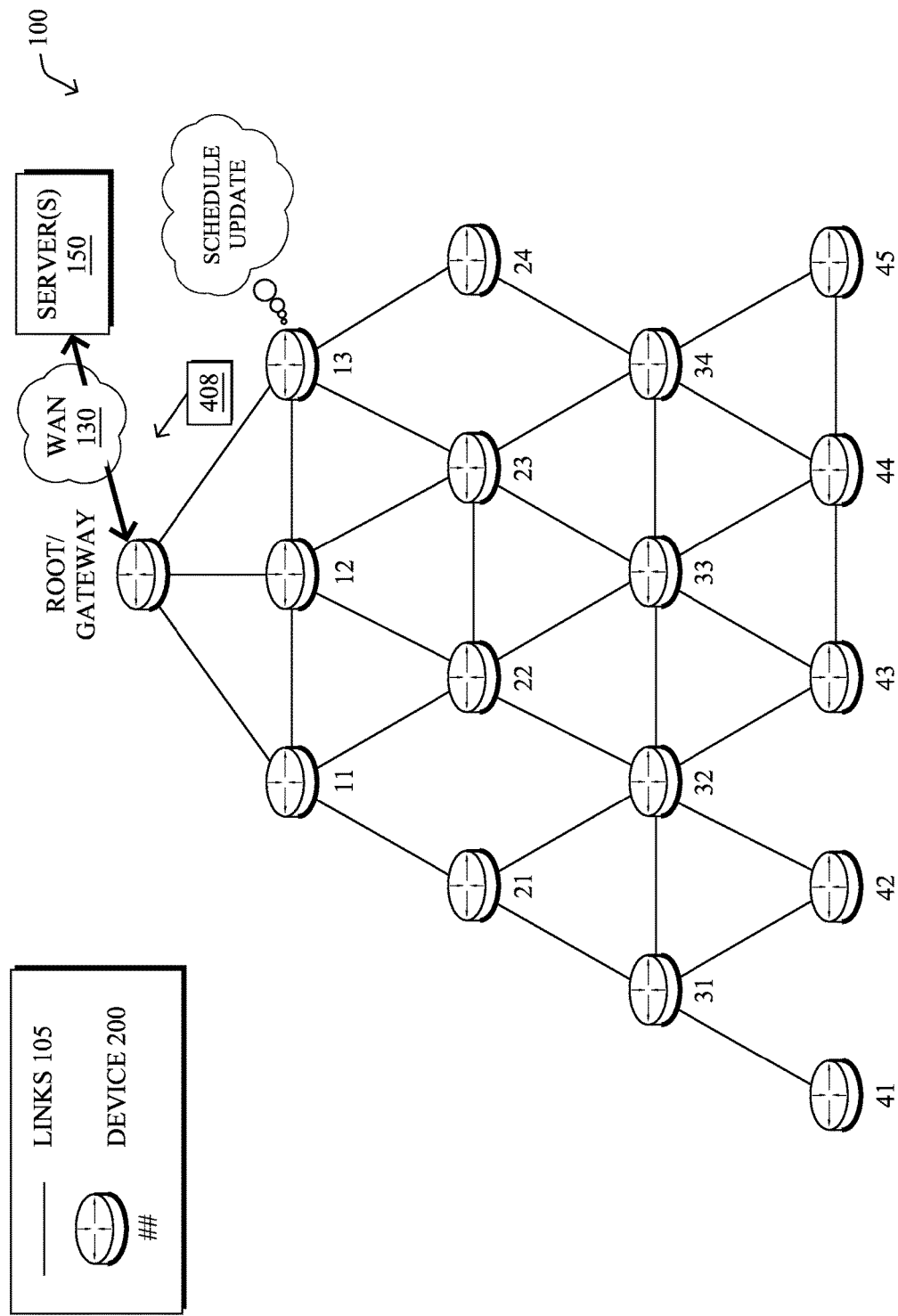

Scheduling of the installation of an update by one or more of the networking devices may be performed in a number of ways. In some cases, the actual installation schedule may be specified by a network administrator via a user interface. For example, as shown in FIG. 4E, a user of server 150 may specify the time at which node 13 should attempt to install software/image update 402. In another embodiment, a supervisory device (e.g., server 150, the Root/Gateway) may determine the installation schedule based on the expected amount of traffic in network 100 (e.g., to schedule the installation when traffic is minimal, etc.), the connections between the devices (e.g., to ensure that there is no single point of failure in the network during an attempted installation), or any other such factors. The supervisory device may then provide the schedule(s) to the one or more devices that are to install the update. For example, as shown in FIG. 4E, server 150 may provide schedule information 406 to node 13 indicating when node 13 should begin installation of update 402 and/or a timeframe during which node 13 is authorized to install update 402. In some embodiments, the devices in network 100 may negotiate their own installation schedules based on input from their peers. For example, as shown in FIG. 4F, node 13 may negotiate its installation schedule with its peers/neighbors and provide data 408 regarding its determined schedule to its peers/neighbors.

Referring now to FIGS. 5A-5E examples are shown of a device selecting a peer/neighbor as an installation monitor, according to various embodiments. While in a monitor-selection state, a device set to install a software/image update may select one of its peers/neighbors to monitor the device during the installation. In the case of an installation failure, the monitor may help to recover the device and/or notify one of servers 150 (e.g., an NMS, etc.), so that a network administrator can initiate repairs.

Figure 5A:
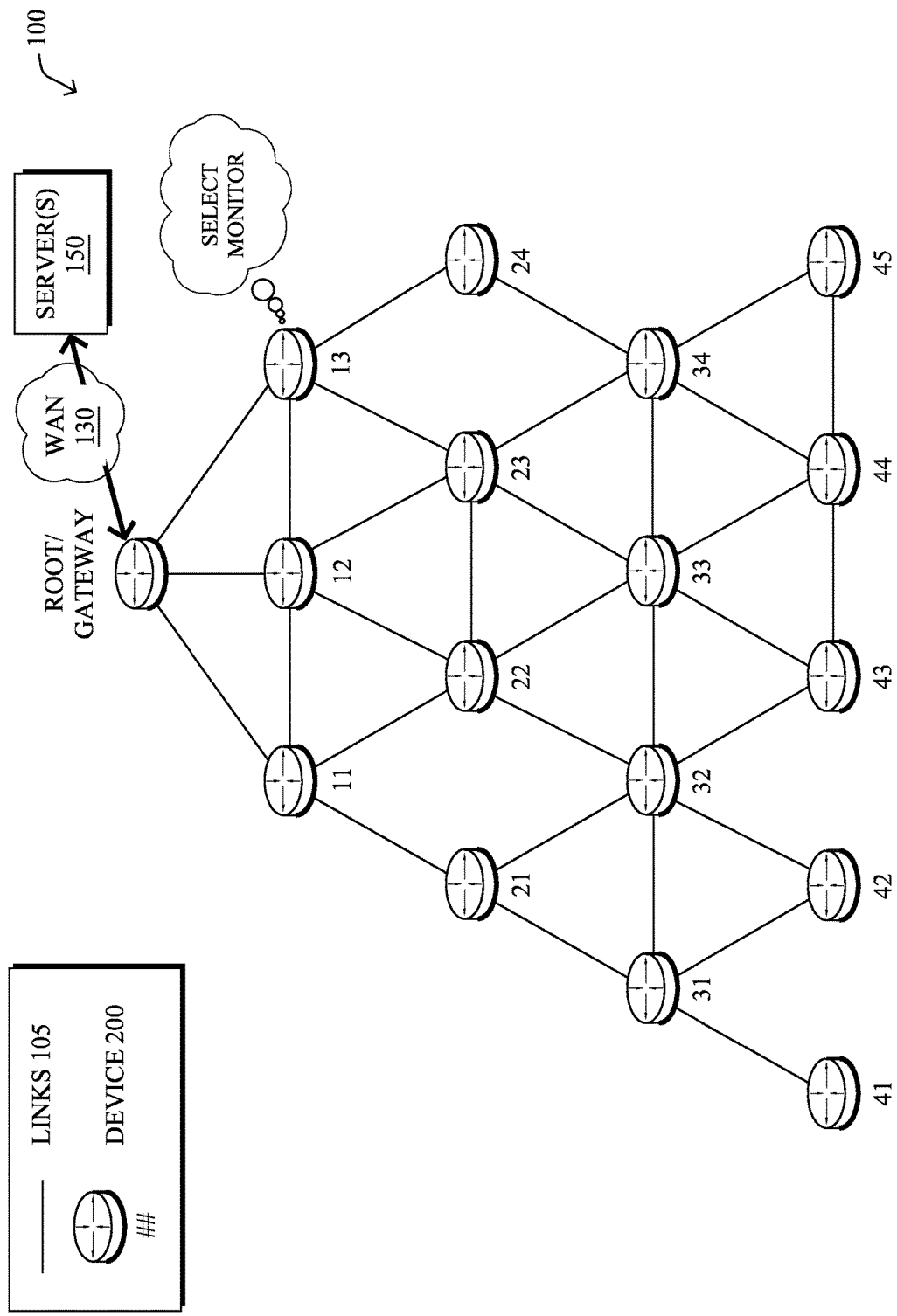
FIGS. 5A-5E illustrate examples of a device selecting a peer/neighbor as an installation monitor.

As shown in FIG. 5A, node 13 may select one of its peer nodes to monitor its installation of a software/image update. Typically, a neighbor device that has local link connectivity to the updating device may be selected to monitor the installation of the update. For example, continuing the examples of FIGS. 4A-4F, node 13 may select its neighbor/peer node 12 to monitor its installation of software/image update 402. In another embodiment, a supervisory device in the network (e.g., a network controller, etc.) may be selected to monitor the installation. However, selection of a peer/neighbor as the monitor may ensure recovery of the updating device in cases where the updating device becomes unreachable except via its local links, thereby eliminating the need for a technician to restore the configuration of the updating device.

Figure 5B:
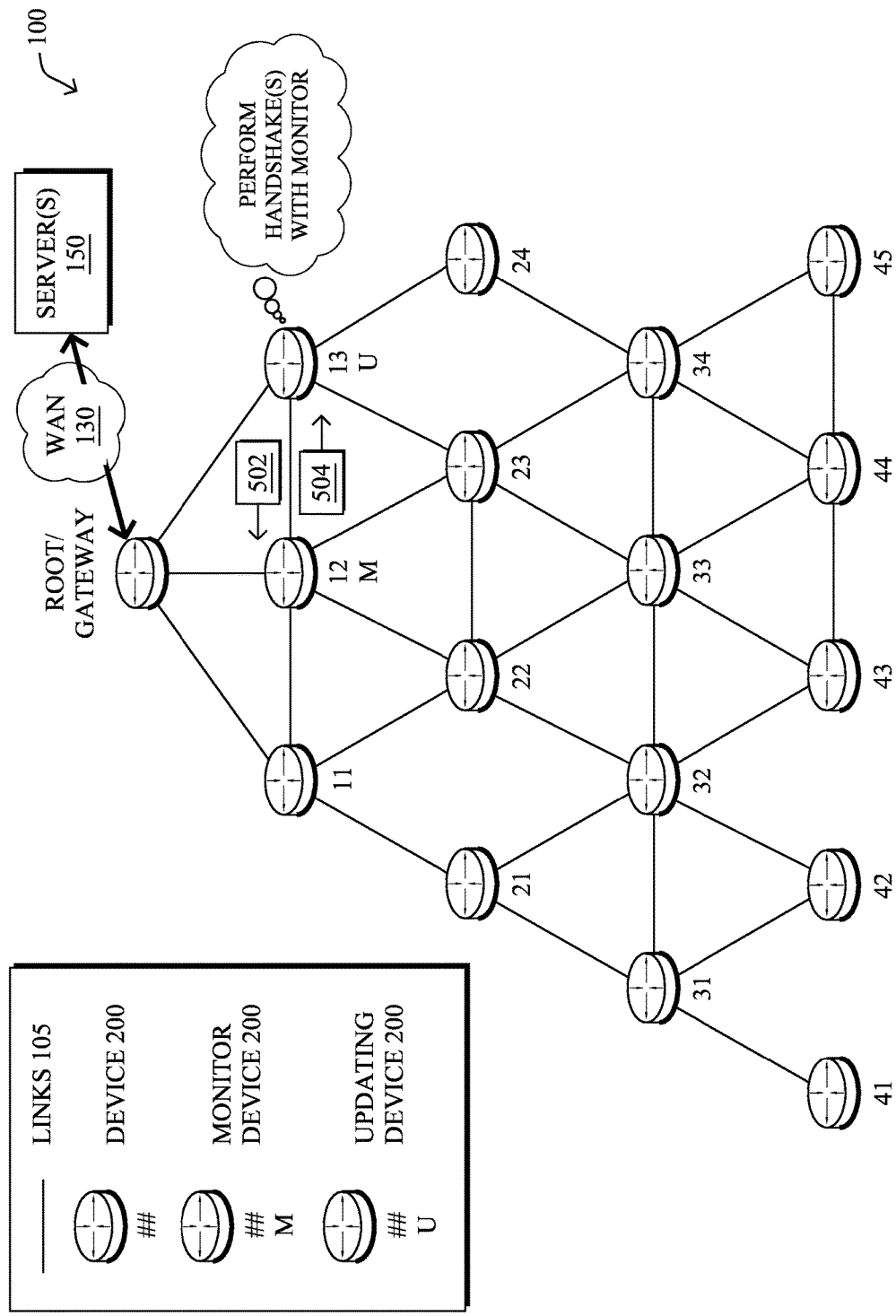

An updating device may perform one or more handshakes with its selected monitor, prior to attempting to install the software/image update. For example, as shown in FIG. 5B, updating node 13 may send one or more messages 502 to monitor node 12, indicating that node 13 has selected node 12 to monitor its installation of the update. In response, node 12 may send one or more messages 504 to node 13, indicating whether node 12 is able to act as a monitor for device 13 (e.g., node 12 may not have sufficient resources, node 12 may already be monitoring the updating of another device, node 12 determines that there are wrong configuration register settings, etc.). In a further embodiment, node 12 may generate an alert for a network administrator regarding any failures during the handshake with node 13.

In various embodiments, one or more of messages 502 may include state information regarding updating node 13. Monitor node 12 may store such state information for purposes of recovering node 13, in the event of an installation failure. Updating node 13 may also store its state information, in some cases, allowing node 13 to attempt to correct the installation failure before monitor node 12 intervenes. For example, updating node 13 may generate the state information by issuing any or all of the following commands:

show version
show module
show memory
show ip int brief
show ip int brief|in up
show inventory
show power
show interface status
show interface description
show policy-map interface
show ether channel summary
show cdp neighbors
show cdp neighbors detail
show ip route summary
show ip ospf neighbor
show ip ospf int brief
show isis neighbors
show clns interface
show mpls ldl neighbor
show mpls forwarding-table
show mpls interface
show ip bgp summary
show ipv4 unicast neighbors
show redundancy
show proc cpu history
show proc cpu sorted
show log
show platform hardware capacity cpu Other commands may be issued on different types of devices, to obtain any or all of the above-listed parameters. The configuration may be saved by updating node 13 by issuing a wr mem command or a similar command. In some cases, node 13 may store the state information to be used for purposes of recovery within a file having a predefined name suffix (e.g., _pre_update_pre_reroute_state, or the like). Such a file may be included in one or more of messages 502 sent to monitor node 12.

Figure 5C:
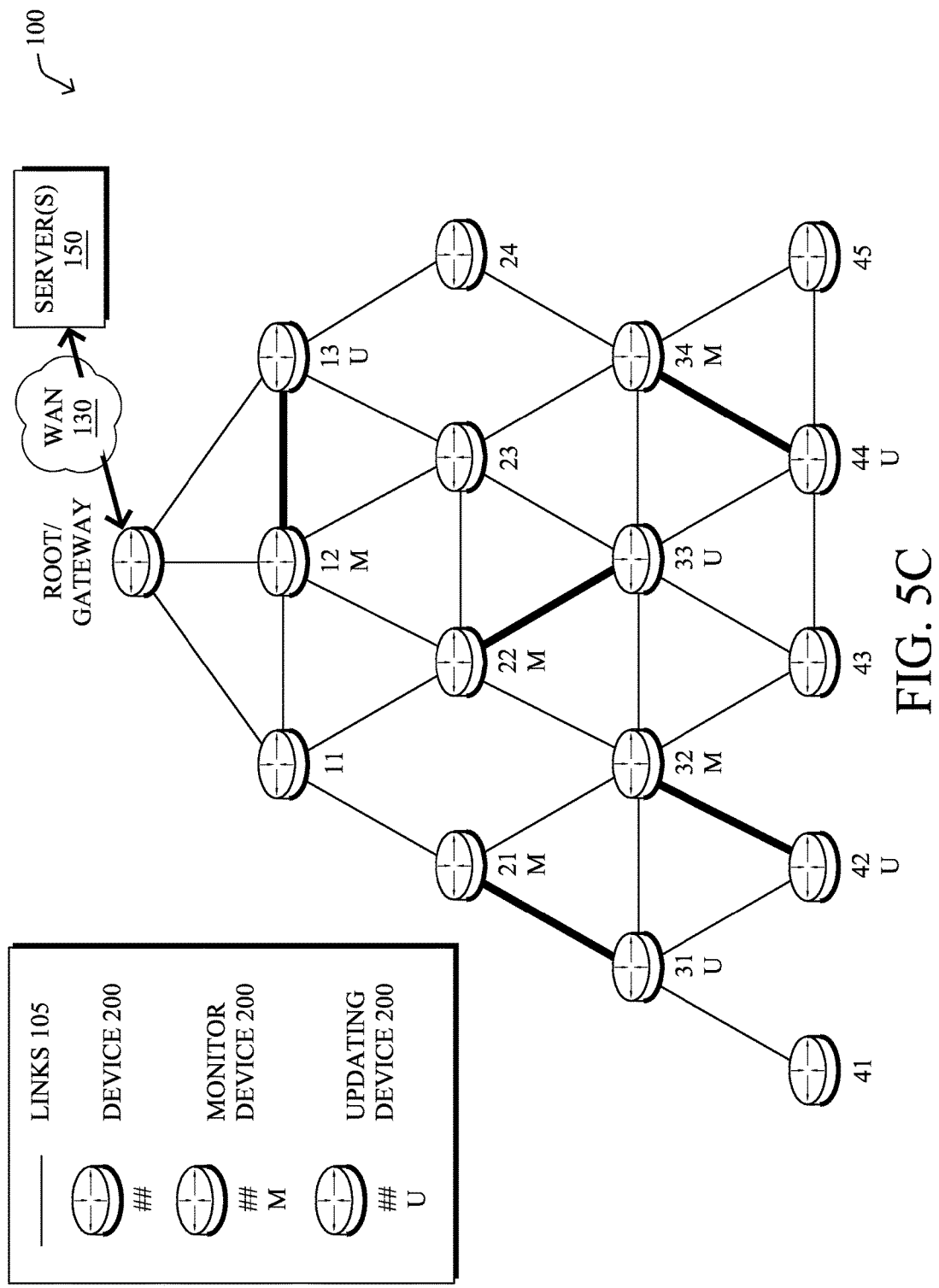

As shown in FIG. 5C, each device scheduled to install an update may have a corresponding monitor, in one embodiment. For example, node 34 may monitor updating node 44, node 32 may monitor updating node 42, node 22 may monitor updating node 33, node 31 may monitor updating node 31, and node 12 may monitor updating node 13. In one embodiment, a monitor may be selected so long as the monitor has a path to the Root/Gateway that does not include any updating nodes.

In some embodiments, the monitor selection process may also be based in part on the effects of the installations on the network. For example, pairs of monitors and updaters may only be selected if there is sufficient redundancy in the network with respect to the updating devices (e.g., based on Hot Standby Router Protocol (HSRP) information, etc.). In another embodiment, the devices may also coordinate a finalized installation schedule for the updating devices. For example, assume that the installation schedule issued by a supervisory device (e.g., from a user interface device operated by a network administrator, etc.) specifies an update window. In such a case, the devices in network 100 may schedule the installations within the time window such that the finalized update schedule for the devices minimizes or eliminates the possibility of network failures during the updating.

Figure 5D:
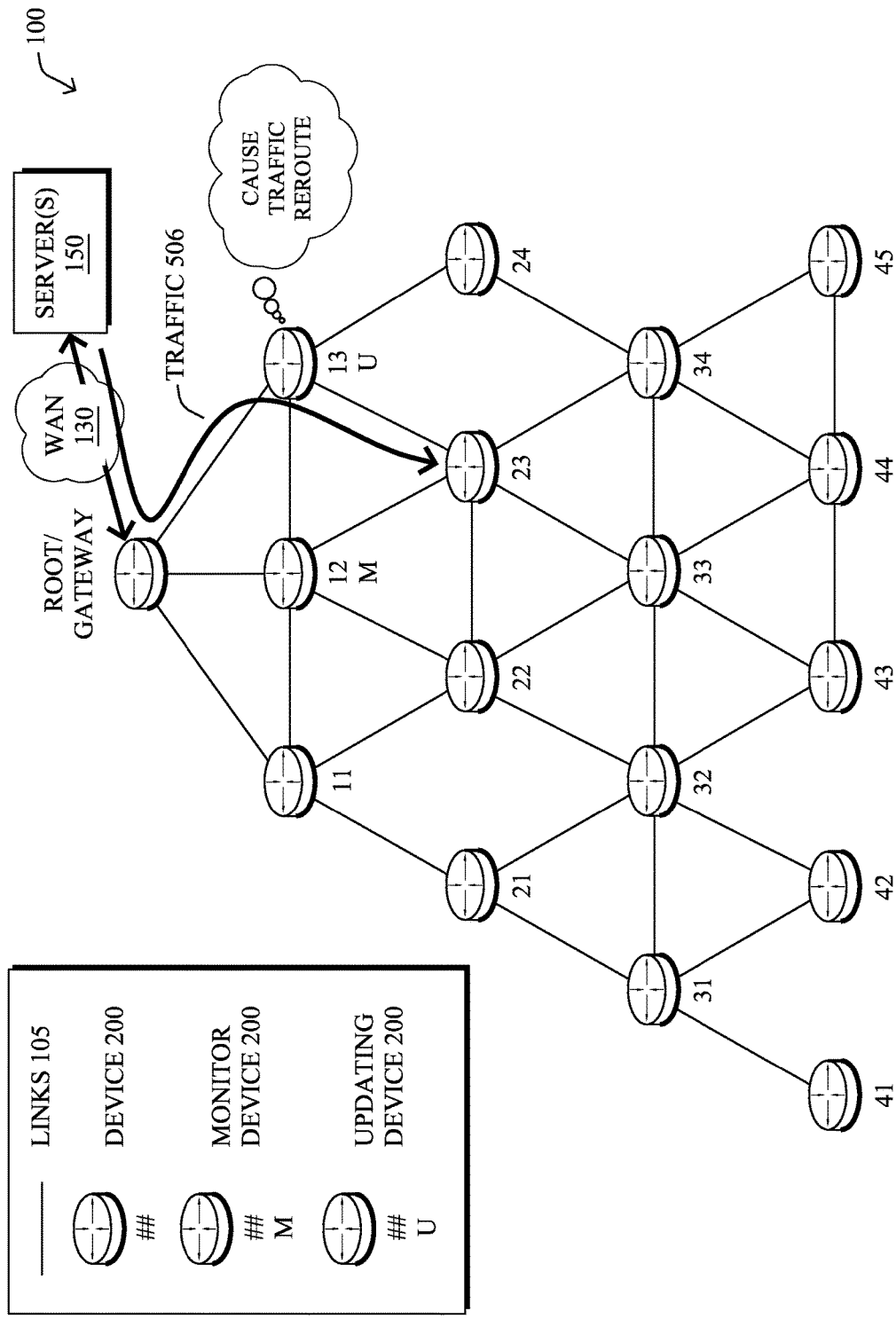
Figure 5E:
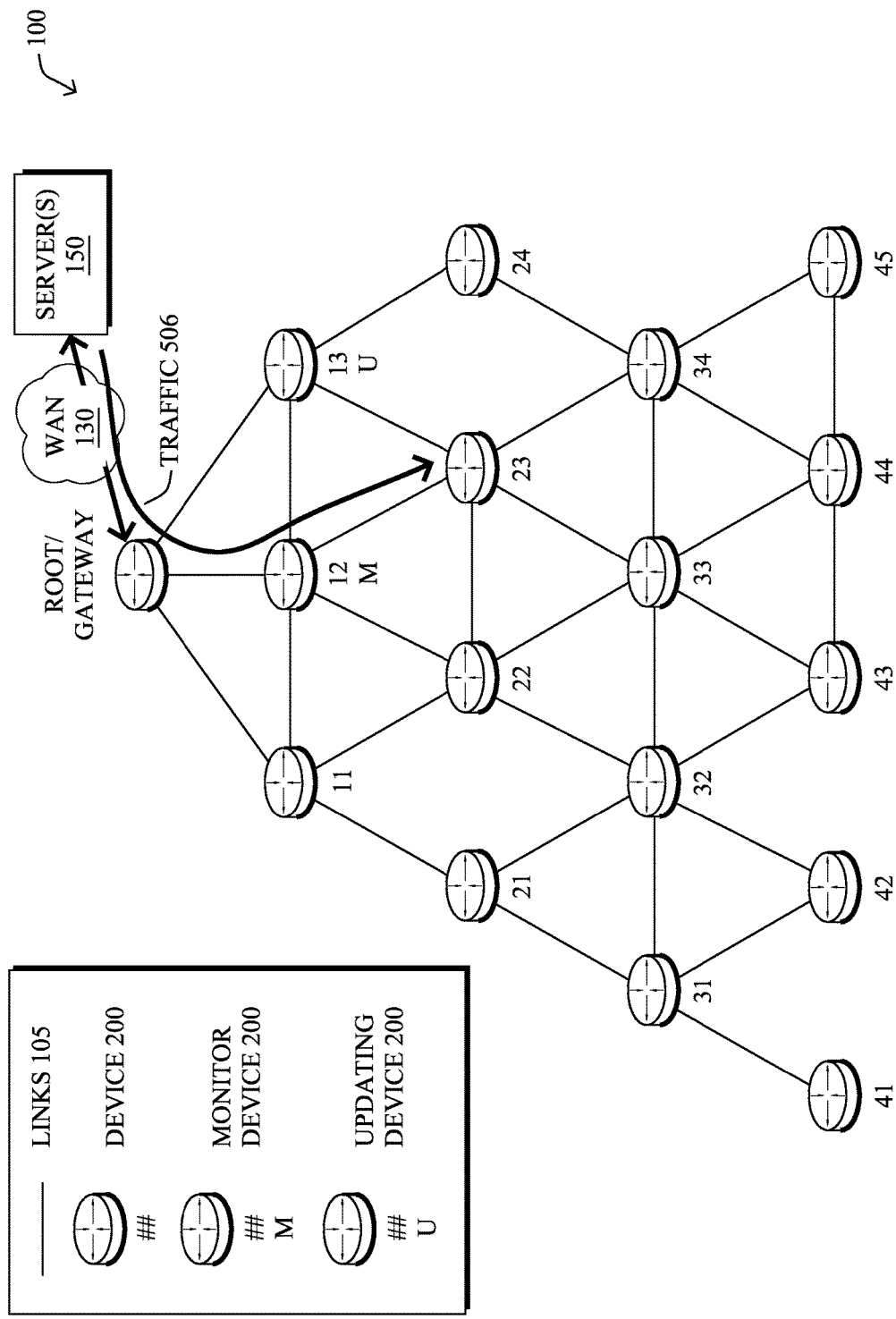

In some embodiments, traffic may be routed away from an updating device, prior to the updating device initiating installation of the update. For example, as shown in FIG. 5D, updating node 13 may cause traffic 506 sent to node 23 to be routed away from node 13, prior to node 13 attempting to install the update. In various embodiments, node 13 may cause the reroute of traffic 506 by setting one or more routing protocol parameters. For example, node 13 may set an ISIS overload bit (e.g., to indicate that node 13 is overloaded, thereby triggering a reroute), an OSPF max metric parameter (e.g., to cause the cost associated with links to node 13 to be maximal, thereby causing routers to select different paths away from node 13), etc. As a result, as shown in FIG. 5E, traffic 506 sent to node 23 may instead be routed through node 12 while node 13 attempts to install the update.

After traffic has been routed away from an updating device, the updating device may perform another handshake with its monitor, prior to attempting to install the update, in one embodiment. For example, the updating device may generate and send a new set of recovery/state information to its monitor, after causing the network traffic to be routed away from the updating device. The updating device may similarly store this information in its own memory, for purposes of recovery (e.g., to attempt to recover from the failure locally before relying on its monitor). For example, such recovery information may be stored in a separate recover file having a predefined prefix (e.g., _pre-upgrade_post-reroute_state, etc.).

Figure 6A:
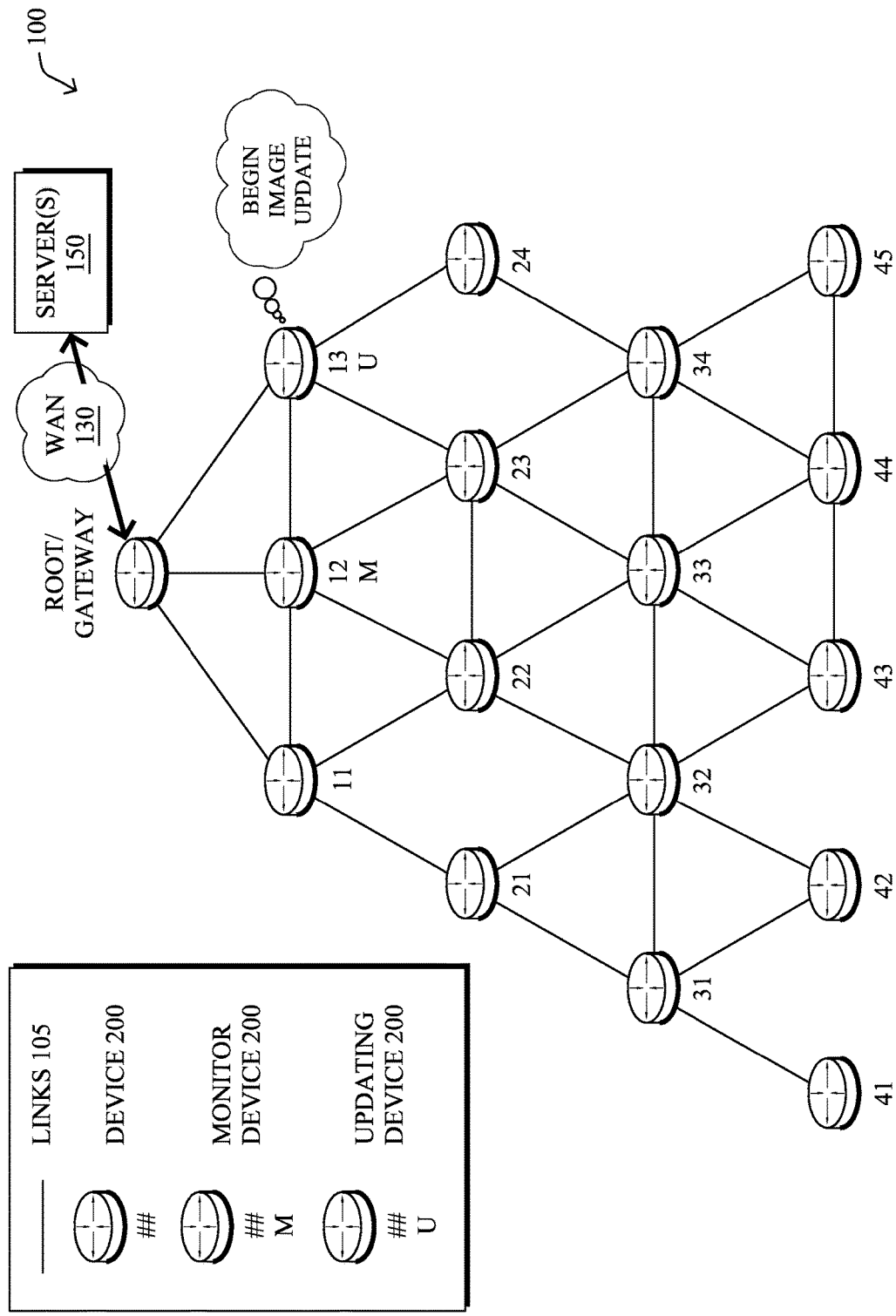
FIGS. 6A-6F illustrate examples of the peer-assisted updating of a device.

FIGS. 6A-6F illustrate examples of the peer-assisted updating of a device, according to various embodiments. In general, once a device has performed all of its required pre-installation operations (e.g., validating the update, selecting a monitor, causing its traffic to be redirected, etc.), it may attempt to install the update at its scheduled time. For example, as shown in FIG. 6A, updating node 13 may begin installing the software/image update.

Figure 6B:
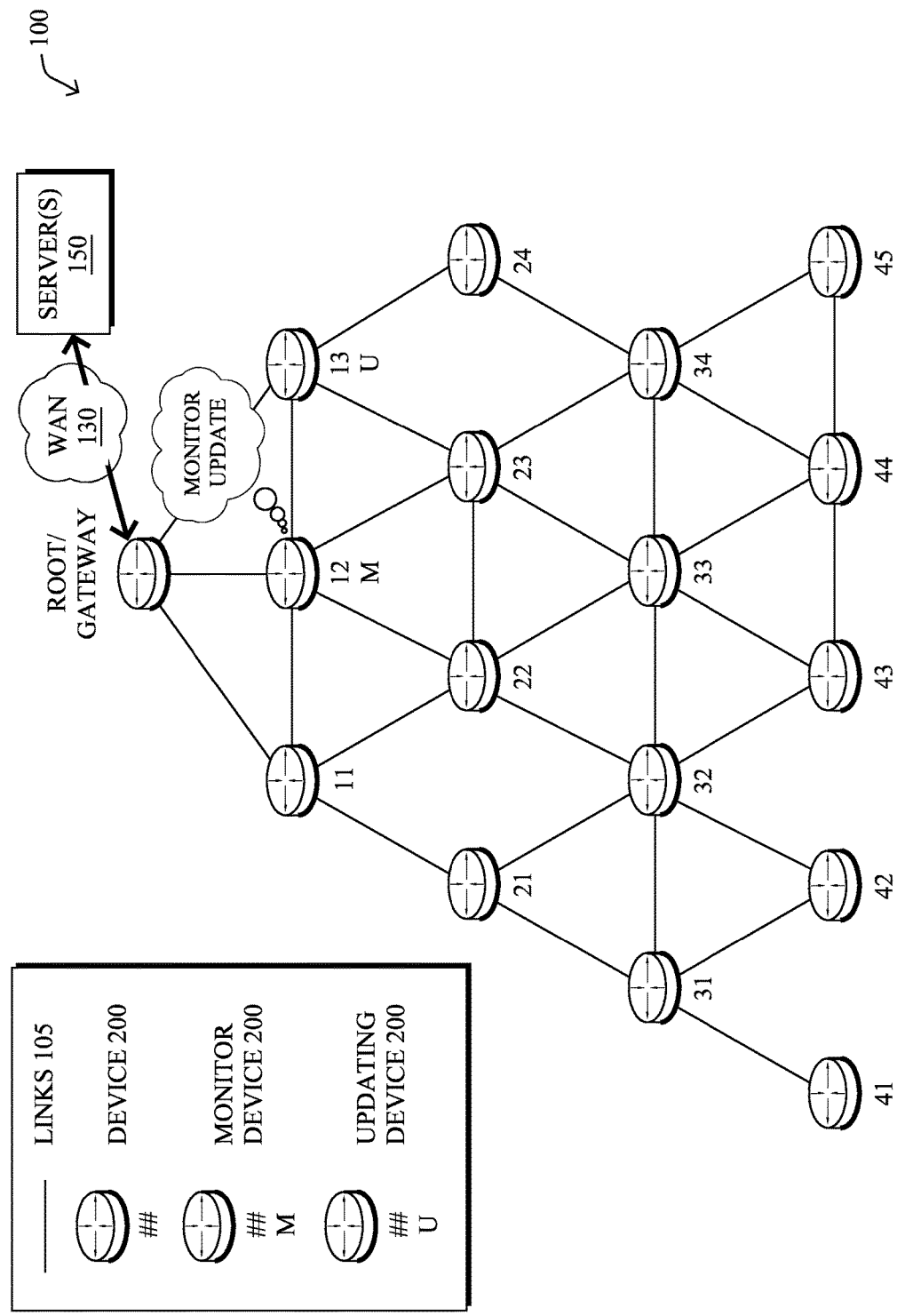

During installation, the selected monitor for an updating device may monitor the condition of the updating device, to ensure that the installation was successful. For example, as shown in FIG. 6B, monitor node 12 may monitor updating node 13 while the update is installed by node 13, to determine whether any installation failures have occurred. In some cases, updating node 13 may be required to perform a reboot as part of the installation process. For example, node 13 may set a bootvar parameter via its operating system and save a file with a variable set to indicate after reboot that node 13 was rebooted due to an update. Such a file may have a unique prefix (e.g., _update_reload_active, etc.).

Figure 6C:
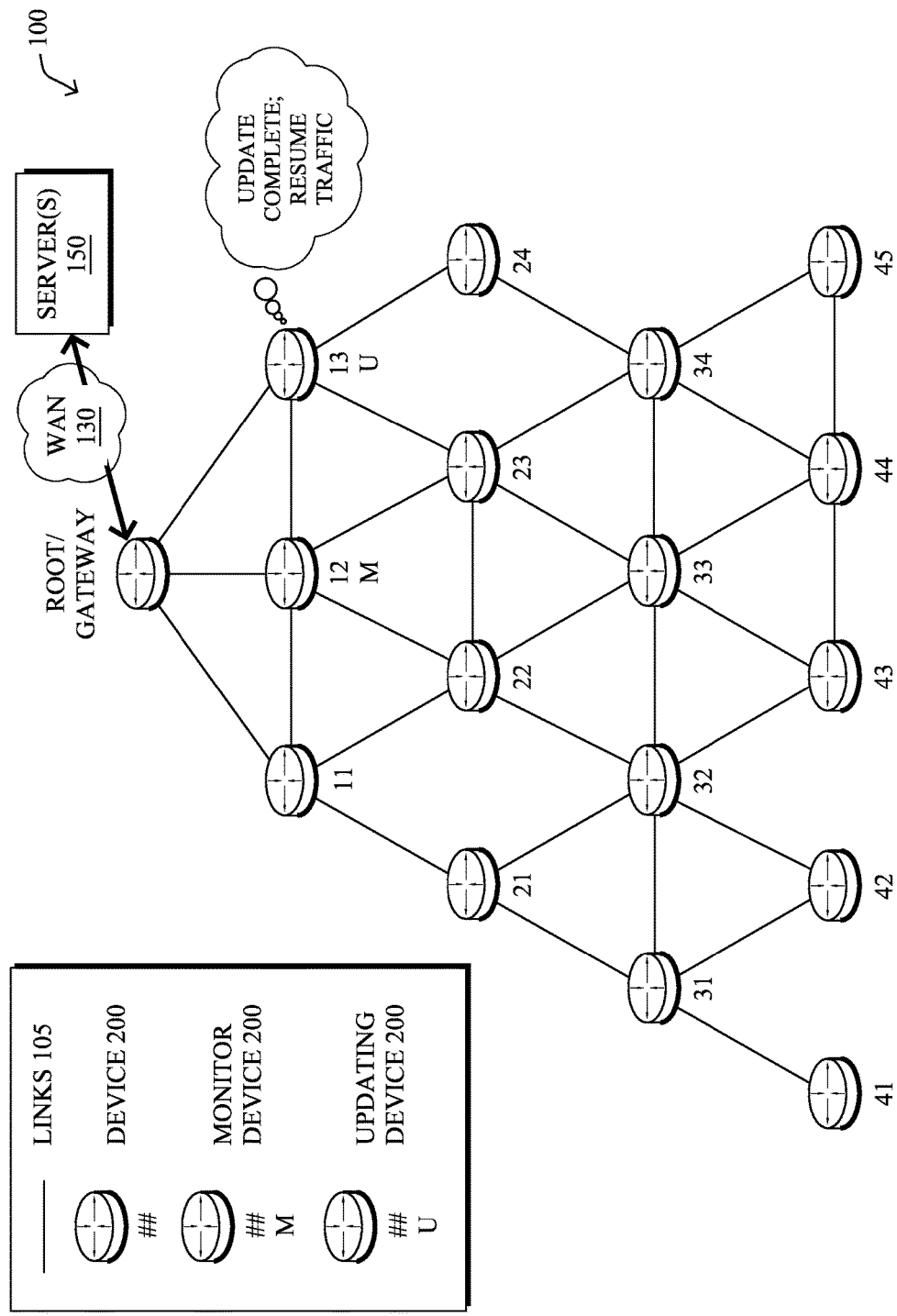
Figure 6D:
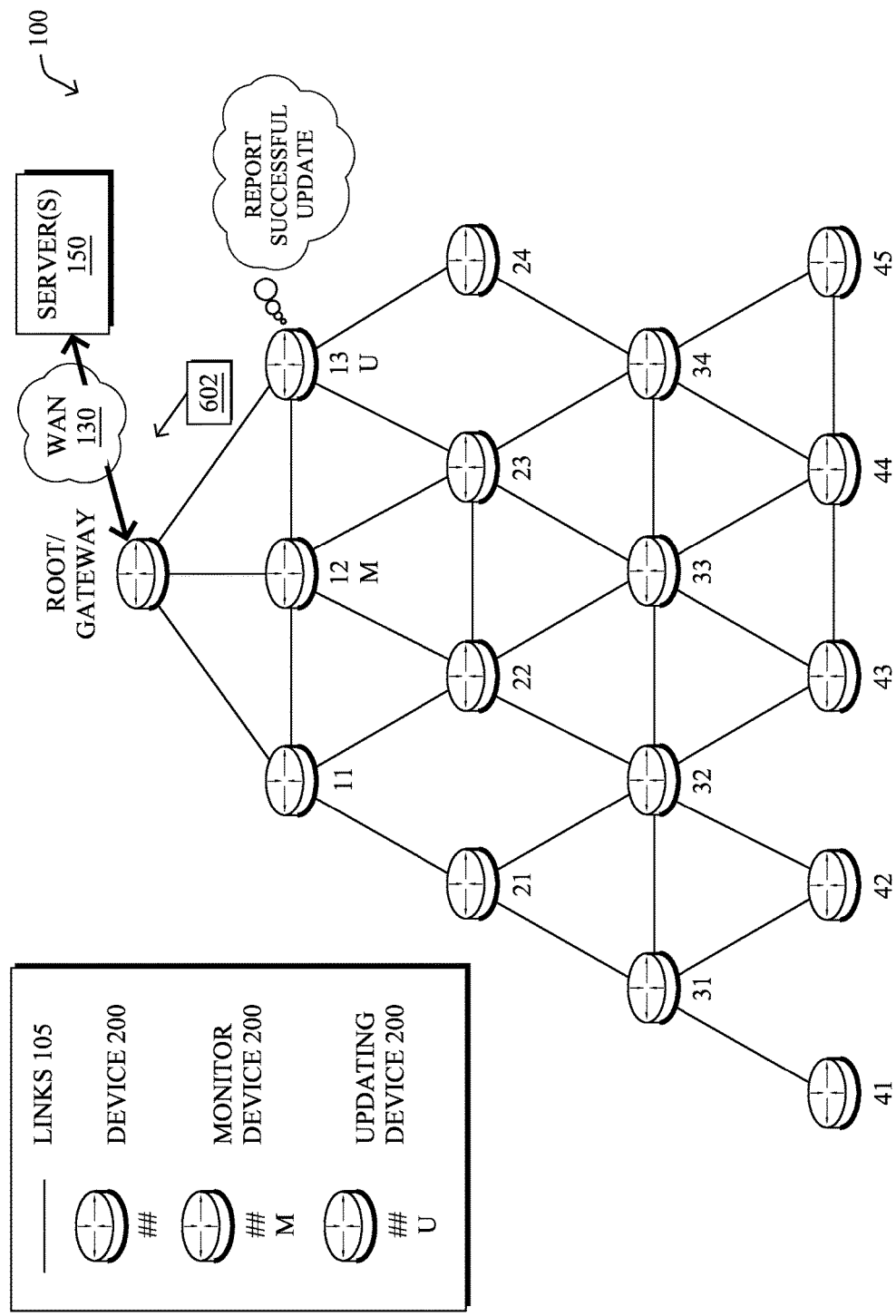
Figure 6E:
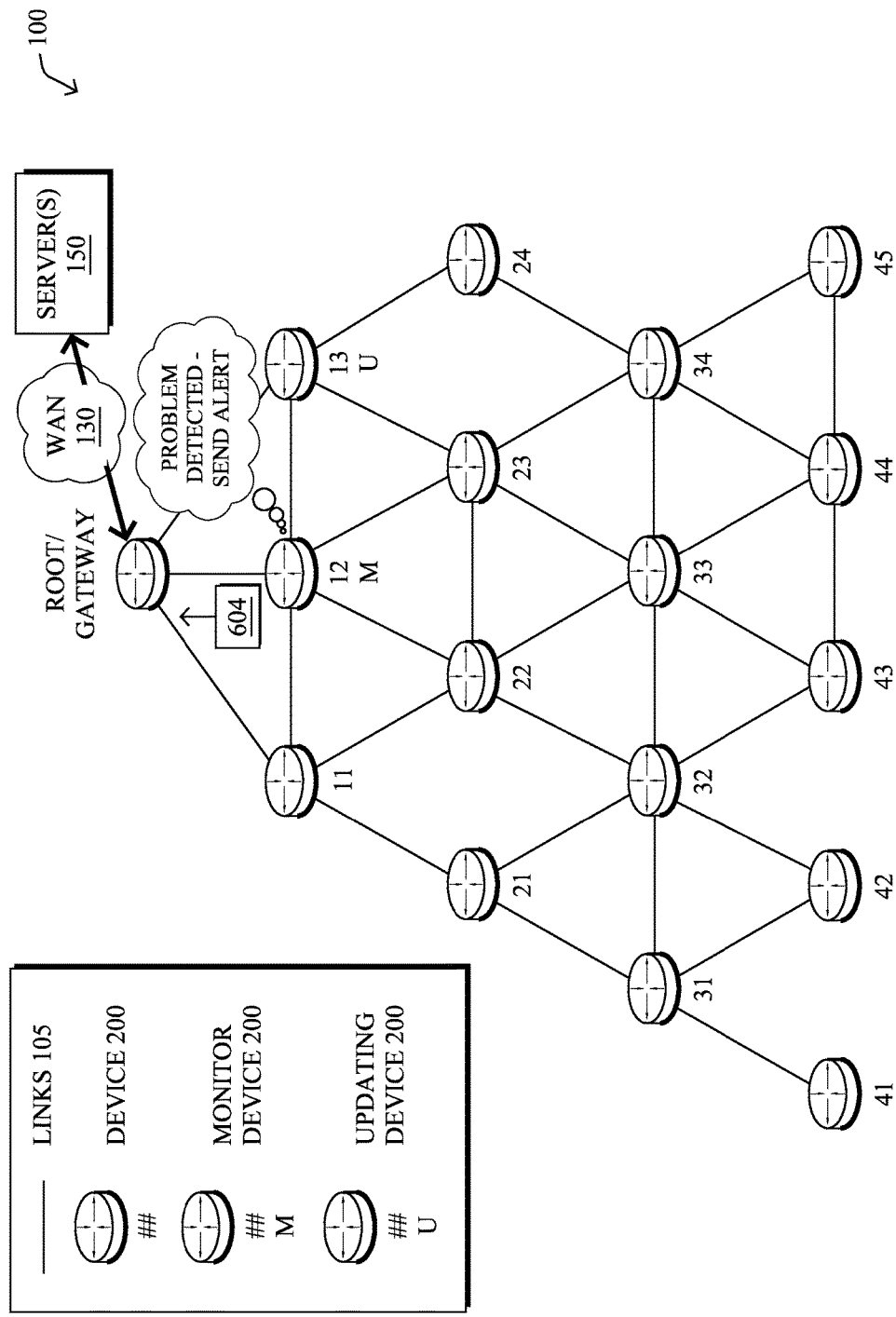

Once the installation of the update is complete, the updating device may compare its current state to its configuration that was stored by the device prior to installation of the update (e.g., the post-reroute configuration, etc.). If no failures result from the comparison, the updating device may determine that the update was successful and cause traffic to the device to be reinstated. For example, as shown in FIG. 6C, updating node 13 may determine that it was successfully updated and cause traffic to be directed again to node 13 (e.g., by unsetting the ISIS overload bit, by unsetting the OSPF max metric parameter, etc.). As shown in FIG. 6D, updating node 13 may also provide a notification 602 to the supervisory device (e.g., the Root/Gateway, server 150, etc.), indicating that node 13 was updated successfully. Node 13 may also perform any cleanup necessary (e.g., by removing the old image from its memory, etc.). However, if, during the installation process, monitor node 12 determines that an installation failure has occurred at node 13, it may send an alert 604 to a supervisory device (e.g., one of servers 150, etc.), as shown in FIG. 6E.

Monitor node 12 may detect an installation failure at node 13 in a number of ways. In one embodiment, monitor node 12 may begin a timer when updating node 13 begins installation of the update. Correspondingly, node 13 may send notification 602 to monitor node 12 (e.g., after node 13 reboots and determines that the installation was successful), to release node 12 as its monitor and to cause node 12 to perform a cleanup (e.g., by removing the update restoration data from its memory, etc.). Thus, if monitor node 12 does not receive such a notification within a threshold amount of time, node 12 may determine that an installation failure has occurred. For example, node 13 may notify monitor node 12 when node 13 is to begin installation of the update and monitor node 12 may determine whether an installation failure occurred based on the amount of time since node 12 last received a message in comparison to the scheduled start of the installation.

In further embodiments, monitor node 12 may determine that an installation failure has occurred based on a comparison between the post-installation state of node 13 and the pre-installation state of node 13. In some cases, node 13 may provide data regarding its post-installation state to node 12 for comparison. If any differences exist, node 12 may determine that an installation failure has occurred. In other cases, node 13 may perform the comparison locally and notify node 12 when there is a discrepancy between the pre- and post-installation states of node 13.

Figure 6F:
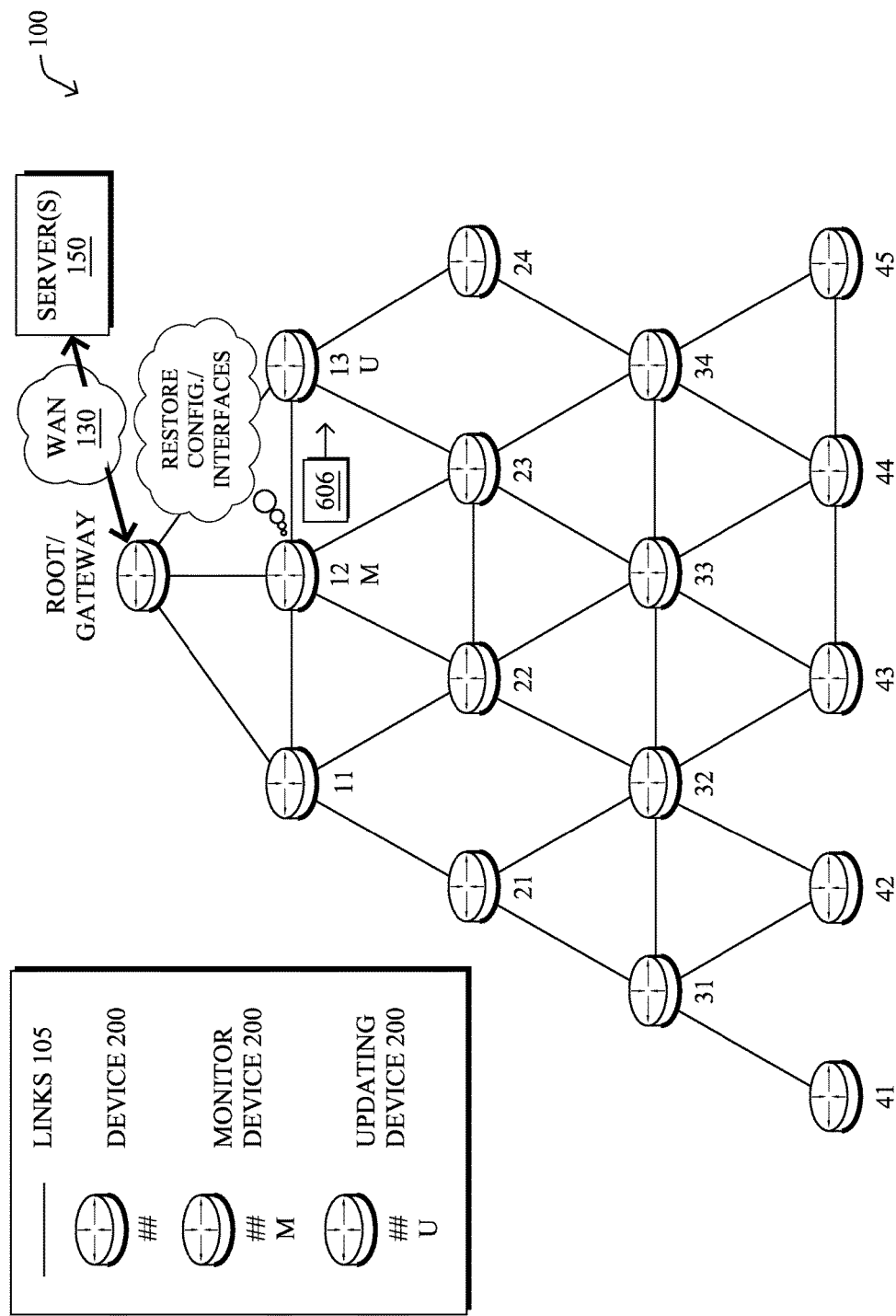

A monitor node may also provide failure recovery to an updating node, in the case of an installation failure. For example, as shown in FIG. 6F, monitor node 12 may provide update recovery data 606 to node 13, when an update installation failure is detected (e.g., the pre- and post-installation configurations of node 13 do not match, etc.). Update recovery data 606 may include any or all of the information provided to monitor node 12 by node 13, prior to node 13 beginning the installation of the update. For example, update recovery data 606 may include configuration data that may be used to restore the pre-installation configuration of node 13. In another example, update recovery data 606 may include data to recovery any down modules or interfaces on node 13 that were working prior to node 13 installing the update. In some embodiments, node 12 may also cause traffic to be restored to node 13, after an update recovery is performed. For example, if node 13 is restored to its pre-installation state by node 12 due to an installation failure, node 12 or node 13 may subsequently cause traffic to be returned to node 13.

Figure 7:
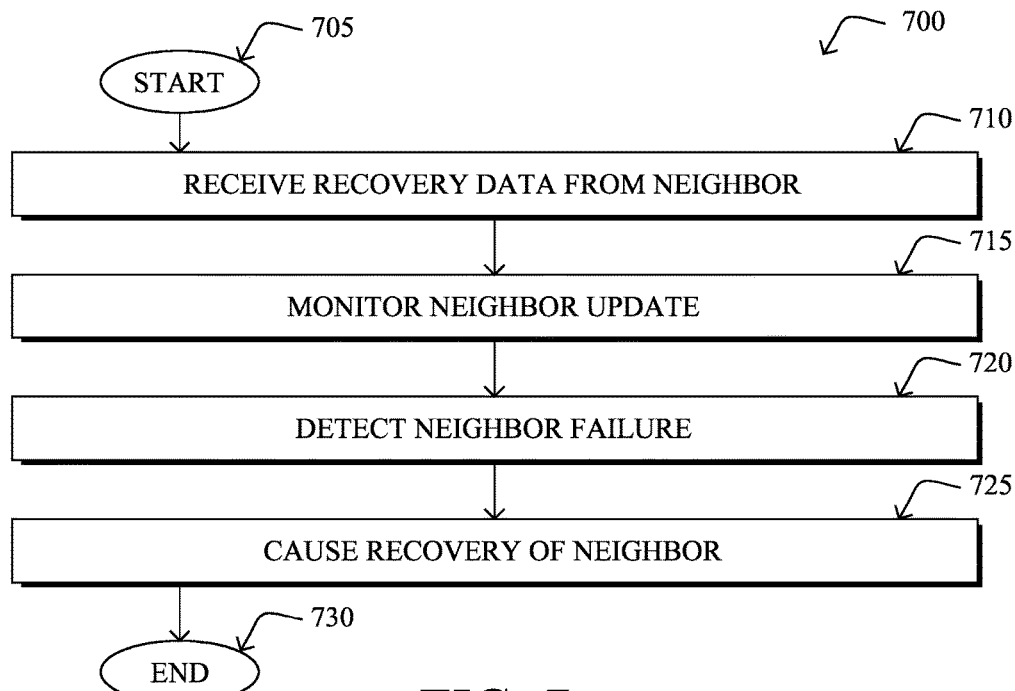
FIG. 7 illustrates an example simplified procedure for monitoring the update of a peer device in a network.

FIG. 7 illustrates an example simplified procedure for monitoring the update of a peer device in a network, in accordance with the embodiments herein. In general, procedure 700 may be performed by a network device (e.g., device 200, etc.) configured to act as a monitor for a peer/neighboring device undergoing a software/image update. Procedure 700 may begin at step 705 and continue on to step 710 where, as described in greater detail above, the device receives recovery data from its network neighbor (e.g., another network node that has a local link to the device). In various embodiments, the recovery data may include data regarding the pre-update configuration, interfaces, and/or running modules of the neighbor.

At step 715, as detailed above, the device may monitor its neighbor during installation of the software/image update by the neighbor. In some embodiments, the device may monitor the neighbor by awaiting a notification from the neighbor regarding the status of the installation. For example, the device may await a confirmation from the neighbor that the installation was completed successfully. In another example, the device may await a request from the neighbor for the recovery data, to restore the neighbor to its pre-installation state, in the case of an installation failure.

At step 720, the device may detect an installation failure of the update by the neighbor, as described in greater detail above. In some cases, functionality may not be restored to the neighbor, as a result of the installation. For example, the neighbor may not correctly boot after installation of the update. In such cases, the device may detect the installation failure based on a timeout. For example, the device may determine that an installation failure has occurred if it did not receive a confirmation message from the neighbor within a threshold amount of time. In further cases, another form of installation failure may correspond to the neighbor remaining operational, but with a different configuration, interfaces, etc. In such cases, the device may detect the installation failure based on a notification received from the neighbor regarding the post-installation state of the neighbor. Either, or both of, the device and the neighbor may determine that the pre-installation and post-installation states of the neighbor differ, indicating that an installation failure has occurred and that a rollback or other correction may be necessary. For example, the device may compare the pre-installation recovery data received from the neighbor to data regarding the post-installation state of the neighbor, to detect the failure.

At step 725, the device causes recovery of the neighbor using the update recovery data, as detailed above. In some embodiments, the device may provide configuration information in the recovery data to the neighbor, in response to detecting the installation failure. In further embodiments, the device may cause the neighbor to reinstate its pre-installation interfaces or modules, using the update recovery data. Procedure 700 then ends at step 730.

Figure 8:
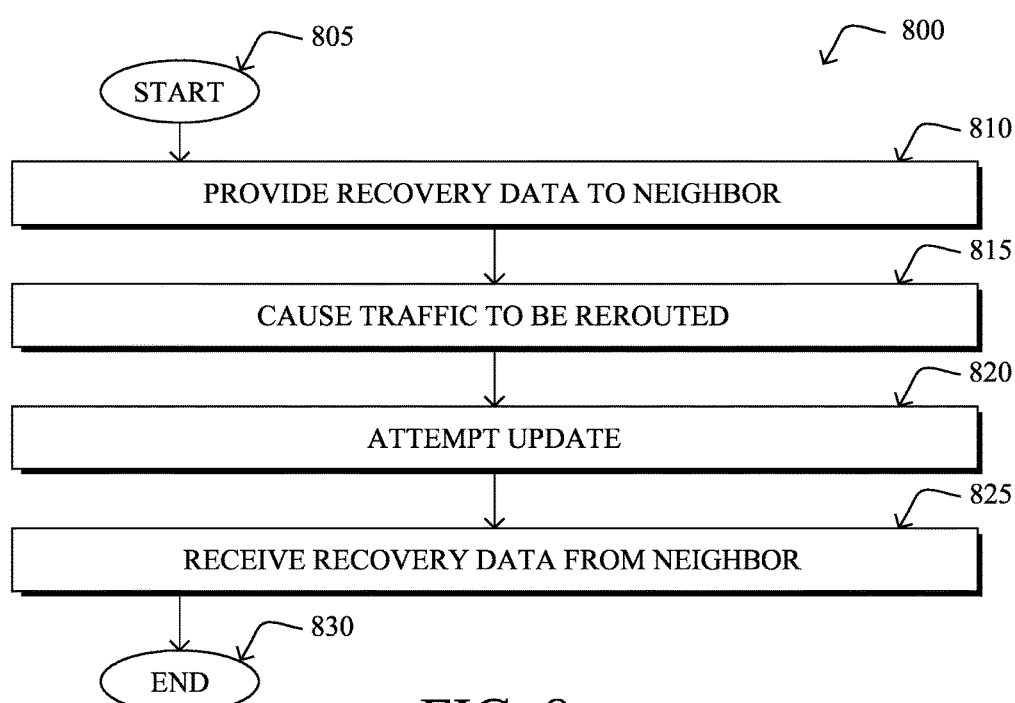
FIG. 8 illustrates an example simplified procedure for updating a networking device with assistance from a peer device.

FIG. 8 illustrates an example simplified procedure for updating a networking device with assistance from a peer device. In general, procedure 800 may be performed by a networking device (e.g., device 200, etc.) operable to install a software/image update with assistance from a peer/neighbor of the device in the network. Procedure 800 may begin at step 805 and continue on to step 810 where, as described in greater detail above, the device may provide update recovery data to its neighbor. In general, such recovery data may be operable to restore the device to its original state as it existed prior to installation of the software/image update. For example, the update recovery data may indicate the pre-installation configuration, interfaces, modules, etc. present on the device prior to attempting to install the update.

At step 815, as detailed above, the device may cause traffic to be routed away from the device. In general, the device may cause the route change by setting one or more routing protocol parameters. For example, if ISIS is used, the device may set the overload bit parameter, thereby causing any upstream routers to select a different path around the device. In another example, if OSPF is used, the device may set the max metric parameter, to maximize the cost associated with sending traffic to the device, thereby causing upstream routers to select a different path.

At step 820, the device may attempt to install the software/image update, as detailed above. For example, the device may attempt to replace its current image with the image update. In some cases, the installation process may also require the device to reboot, to complete the installation. Failures during the attempted installation may include, but are not limited to, the device not functioning as a result of the installation (e.g., the device does not reboot properly, etc.), the device losing its configuration, interfaces, or running modules, or the like.

At step 825, as detailed above, the device may receive the recovery data from its neighbor. In particular, if an installation failure occurs as a result of the device attempting to install the update, the neighbor may provide the recovery data back to the device, to allow the device to recover from the failure. In some embodiments, the device may first attempt to recover from an installation failure locally. For example, the device in some implementations may save its pre-installation configuration and attempt to roll back the update. If the rollback process also fails, the device may notify its neighbor that the recovery data is needed from the neighbor. In other cases, the neighbor may operate as the primary repository for the pre-installation recovery data. In various embodiments, the recovery data may restore the pre-installation configuration(s) of the device, any interfaces of the device (e.g., to allow the device to again communicate with other network devices, etc.), any modules that were running on the device prior to attempting the installation (e.g., software functions, etc.), or any other state of the device. Procedure 800 then ends at step 830.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, allow for the automatic updating of networking devices in an operational network. In some aspects, the techniques herein allow for traffic to be rerouted away from updating devices during installation of an update. In further aspects, the techniques herein allow for a peer/neighbor of an updating device to monitor the update, thereby allowing for error resolution and self-healing, in the case of an installation failure. By standardizing the update process, the techniques herein may significantly increase the predictability of the update process, allow for faster deployment of updates in a network, and reduce the resources needed to perform the updates (e.g., in terms of time, money, effort, etc.).

While there have been shown and described illustrative embodiments that provide for peer/neighbor assisted software/image updates, it is to be understood that various other adaptations and modifications may be made within the spirit and scope of the embodiments herein. For example, the techniques herein may be adapted for use within any kind of network, and is not limited to those mentioned above. Additionally, the protocols discussed herein are exemplary only and other protocols may be used within the scope of the teachings herein. Further, while specific functions are described herein with respect to a singular device, these functions may also be performed by multiple devices in a distributed manner, according to some embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a device in a computer network, update recovery data from a neighbor of the device in the computer network, the device selected by the neighbor to monitor the neighbor during installation of a software update at the neighbor and perform update recovery in case of an installation failure, wherein the device is a peer device that is adjacent and link-local to the neighbor in the computer network, is not a network management device and is capable of communicating with the network management device when the neighbor is no longer reachable by the network management device;

monitoring, by the device, the neighbor during installation of a software update by the neighbor;

detecting, by the device, the installation failure of the software update by the neighbor; and causing, by the device, recovery of the neighbor using the update recovery data, in response to detecting the installation failure of the software update by the neighbor, wherein the update recovery for devices in the computer network is distributed and performed by a plurality of peer devices in the computer network.

2. The method as in claim 1, wherein the update recovery data identifies a configuration of the neighbor, wherein causing recovery of the neighbor comprises:

providing, by the device, the identified configuration to the neighbor.

3. The method as in claim 1, wherein the update recovery data identifies an interface or module of the neighbor, wherein causing recovery of the neighbor comprises:

causing, by the device, the neighbor to restore the identified interface or module.

4. The method as in claim 1, wherein detecting the installation failure comprises:

determining, by the device, that the neighbor has not sent a message to the device in a threshold amount of time.

5. The method as in claim 1, wherein detecting the installation failure comprises:

receiving, at the device, an indication from the neighbor of the installation failure.

6. The method as in claim 1, further comprising:

receiving, at the device, a request from the neighbor to monitor the installation of the software update by the neighbor;

determining, by the device, whether the device has sufficient resources to monitor the installation of the software update by the neighbor; and providing, by the device, an indication as to whether the device has sufficient resources to monitor the installation of the software update by the neighbor.

7. The method as in claim 1, further comprising:

providing, by the device, a notification regarding the detected installation failure to a user interface device.

8. A method comprising:

selecting, by a device in a computer network, a neighbor to monitor the device during installation of the software update at the device and perform update recovery in case of an installation failure, wherein the neighbor is a peer device that is adjacent and link local to the device in the computer network;

providing, by the device in the computer network, update recovery data to a neighbor of the device in the computer network;

causing, by the device, network traffic to be routed away from the device;

attempting, by the device, installation of a software update; and receiving, at the device, the update recovery data from the neighbor, in response to an installation failure of the software update by the device, wherein the update recovery for devices in the computer network is distributed and performed by a plurality of peer devices in the computer network, wherein neighbor is not a network management device and is capable of communicating with the network management device when the device is no longer reachable by the network management device.

9. The method as in claim 8, wherein the update recovery data identifies at least one of: a configuration of the device, an interface used by the device, or a module used by the device.

10. The method as in claim 8, further comprising:

providing, by the device, a notification to the neighbor indicative of whether the installation of the software update by the device was successful.

11. The method as in claim 8, further comprising:

receiving, at the device, data regarding the software update; and providing, by the device, a notification indicative of whether the device is eligible to install the software update, based on the received data regarding the software update.

12. The method as in claim 8, further comprising:

notifying, by the device, the neighbor that the neighbor was selected to monitor the device during installation of the software update; and receiving, at the device, an indication as to whether the neighbor has sufficient resources to monitor the installation of the software update by the device.

13. The method as in claim 8, wherein causing network traffic to be routed away from the device comprises:

setting, by the device, an overload bit in an Intermediate System-to-System (ISIS) message or an Open Shortest Path First (OSPF) max metric parameter.

14. The method as in claim 8, further comprising:

notifying, by the device, the neighbor that the device is to be restarted after installation of the software update, wherein the neighbor is configured to detect the installation failure based on a timeout.

15. An apparatus, comprising:

one or more network interfaces to communicate with a computer network;

a processor coupled to the one or more network interfaces and configured to execute a process; and a memory configured to store the process executable by the processor, the process when executed operable to:

receive update recovery data from a neighbor of the apparatus in the computer network, the apparatus selected by the neighbor to monitor the neighbor during installation of a software update at the neighbor and perform update recovery in case of an installation failure, wherein the apparatus is a peer device that is adjacent and link-local to the neighbor in the computer network, is not a network management device and is capable of communicating with the network management device when the neighbor is no longer reachable by the network management device;

monitor the neighbor during installation of a software update by the neighbor;

detect the installation failure of the software update by the neighbor; and cause recovery of the neighbor using the update recovery data, in response to detecting the installation failure of the software update by the neighbor, wherein the update recovery for devices in the computer network is distributed and performed by a plurality of peer devices in the computer network.

16. The apparatus as in claim 15, wherein the update recovery data identifies a configuration of the neighbor, and wherein the apparatus causes recovery of the neighbor by providing the identified configuration to the neighbor.

17. The apparatus as in claim 15, wherein the update recovery data identifies an interface or module of the neighbor, and wherein the apparatus causes recovery of the neighbor by causing the neighbor to restore the identified interface or module.

18. The apparatus as in claim 15, wherein the apparatus detects the installation failure by determining that the neighbor has not sent a message to the apparatus in a threshold amount of time.

19. The apparatus as in claim 15, wherein the apparatus detects the installation failure by receiving an indication from the neighbor of the installation failure.

20. The apparatus as in claim 15, wherein the process when executed is further operable to:
   receive a request from the neighbor to monitor the installation of the software update by the neighbor;
   determine whether the apparatus has sufficient resources to monitor the installation of the software update by the neighbor; and
   provide an indication as to whether the apparatus has sufficient resources to monitor the installation of the software update by the neighbor.

\* \* \* \* \*